US009421519B2

(12) United States Patent
Chapman

(10) Patent No.: US 9,421,519 B2
(45) Date of Patent: Aug. 23, 2016

(54) SILICA-STABILIZED ULTRAFINE ANATASE TITANIA, VANADIA CATALYSTS, AND METHODS OF PRODUCTION THEREOF

(71) Applicant: CRISTAL USA INC., Hunt Valley, MD (US)

(72) Inventor: David M. Chapman, Ellicott City, MD (US)

(73) Assignee: Cristal USA, Inc., Hunt Valley, MD (US)

( * ) Notice: Subject to any disclaimer, the term of this patent is extended or adjusted under 35 U.S.C. 154(b) by 109 days.

(21) Appl. No.: 13/967,601

(22) Filed: Aug. 15, 2013

(65) Prior Publication Data

US 2013/0331259 A1 Dec. 12, 2013

Related U.S. Application Data

(62) Division of application No. 12/533,414, filed on Jul. 31, 2009, now Pat. No. 8,545,796.

(51) Int. Cl.
*B01J 23/30* (2006.01)
*B01J 21/06* (2006.01)
(Continued)

(52) U.S. Cl.
CPC ............ *B01J 21/08* (2013.01); *B01D 53/9418* (2013.01); *B01J 21/063* (2013.01); *B01J 23/22* (2013.01); *B01J 23/30* (2013.01); *B01J 35/006* (2013.01); *B01J 35/0013* (2013.01); *B01J 35/1014* (2013.01); *B01J 35/1038* (2013.01); *B01J 37/0209* (2013.01); *B01J 37/035* (2013.01);
(Continued)

(58) Field of Classification Search
None
See application file for complete search history.

(56) References Cited

U.S. PATENT DOCUMENTS 4,221,768 A   9/1980   Inoue et al.
4,280,989 A   7/1981   Seimiya et al.
(Continued)

FOREIGN PATENT DOCUMENTS

EP   0225062     6/1987
EP   0472358 B1  1/1996
(Continued)

OTHER PUBLICATIONS

Australian Innovation Application No. 2012100019, David M. Chapman, Innovation Patent Examination Report No. 3 (6 pages) Date of Issue Oct. 6, 2012).

(Continued)

*Primary Examiner* — Colin W Slifka
(74) *Attorney, Agent, or Firm* — Greenberg Traurig, LLP; Jonathan D. Ball

(57) ABSTRACT

The invention is directed to compositions and processes for the production of silica-stabilized ultrafine anatase titanias and which may further comprise tungsten and vanadia. The surface stabilization may be by treatment of the $TiO_2$ particles with a low molecular weight and/or small nanoparticle form of silica such as, in preferred embodiments, a tetra(alkyl)ammonium silicate or silicic acid, which serves to efficiently maintain the anatase phase and prevent crystal growth under severe thermal and hydrothermal conditions, even in the presence of vanadia. The vanadia catalysts produced from the novel titanias have equal or improved catalytic activity for selective catalytic reduction of NOx compared to conventional vanadia supported silica-titania based catalysts. The invention is further directed to diesel emission catalytic devices comprising the novel titania-based catalyst compositions.

13 Claims, 10 Drawing Sheets

(51) Int. Cl.

| | |
|---|---|
| *B01J 21/08* | (2006.01) |
| *B01J 35/10* | (2006.01) |
| *B01J 37/04* | (2006.01) |
| *B01J 37/08* | (2006.01) |
| *B01D 53/94* | (2006.01) |
| *B01J 23/22* | (2006.01) |
| *B01J 35/00* | (2006.01) |
| *B01J 37/02* | (2006.01) |
| *B01J 37/03* | (2006.01) |

(52) U.S. Cl.
CPC ............... *B01J 37/04* (2013.01); *B01J 37/08* (2013.01); *B01D 53/9477* (2013.01); *B01D 2251/2067* (2013.01); *B01D 2255/20707* (2013.01); *B01D 2255/20723* (2013.01); *B01D 2255/20776* (2013.01); *B01D 2255/30* (2013.01); *B01D 2258/012* (2013.01)

(56) References Cited

U.S. PATENT DOCUMENTS

| | | | |
|---|---|---|---|
| 4,409,339 | A | 10/1983 | Matsuda et al. |
| 4,510,073 | A | 4/1985 | Hara et al. |
| 4,725,572 | A | 2/1988 | Sera et al. |
| 4,859,439 | A | 8/1989 | Rikimaru et al. |
| 4,929,586 | A | 5/1990 | Hegedus et al. |
| 5,085,840 | A | 2/1992 | Held et al. |
| 5,087,430 | A | 2/1992 | Hanada et al. |
| 5,128,060 | A | 7/1992 | Ueno et al. |
| 5,198,403 | A | 3/1993 | Brand et al. |
| 5,204,387 | A | 4/1993 | Matsuzaki et al. |
| 5,550,096 | A | 8/1996 | Inoue et al. |
| 5,580,533 | A | 12/1996 | Kivioja et al. |
| 5,582,809 | A | 12/1996 | Rikimaru et al. |
| 5,723,404 | A | 3/1998 | Butje et al. |
| 5,837,635 | A | 11/1998 | Kischkewitz et al. |
| 5,877,330 | A | 3/1999 | Kishimoto et al. |
| 6,956,006 | B1 | 10/2005 | Mirsky et al. |
| 7,083,769 | B2 | 8/2006 | Moerters et al. |
| 7,175,821 | B2 | 2/2007 | Flynn et al. |
| 7,763,222 | B2 | 7/2010 | Miyairi et al. |
| 7,829,062 | B2 | 11/2010 | Lai et al. |
| 2002/0112836 | A1* | 8/2002 | Ward .................... C08G 73/00 162/166 |
| 2003/0103889 | A1 | 6/2003 | Mirsky et al. |
| 2003/0104932 | A1 | 6/2003 | Kim |
| 2003/0129153 | A1 | 7/2003 | Moerters et al. |
| 2004/0180783 | A1 | 9/2004 | Nojima et al. |
| 2004/0198592 | A1* | 10/2004 | Hu et al. ..................... 502/304 |
| 2005/0106095 | A1 | 5/2005 | Manorama et al. |
| 2005/0137082 | A1 | 6/2005 | Nojima et al. |
| 2005/0282285 | A1* | 12/2005 | Radhamohan et al. ......... 436/55 |
| 2007/0129241 | A1 | 6/2007 | Schermanz et al. |
| 2007/0155622 | A1 | 7/2007 | Goodwin et al. |
| 2007/0224093 | A1 | 9/2007 | Miyairi et al. |
| 2009/0047424 | A1 | 2/2009 | Momma et al. |

FOREIGN PATENT DOCUMENTS

| | | |
|---|---|---|
| JP | 59035027 | 2/1984 |
| JP | 59035028 | 2/1984 |
| JP | 2001-286734 | 10/2001 |
| JP | 2002-273220 A | 9/2002 |
| JP | 2003093880 | 4/2003 |
| JP | 2003-267723 A | 9/2003 |
| JP | 2007-285295 A | 11/2007 |
| WO | 0220407 | 3/2002 |

OTHER PUBLICATIONS

Beeckman et al., "Design of Monolith Catalysts for Power Plant No Emission Control", Ind. Eng. Chem. Res., (1991), vol. 30, pp. 969-978.
Bosch et al., "Catalytic Reduction of Nitrogen Oxides: A Review of the Fundamentals and Technology", Catalysis Today, (1988) vol. 2, No. 4, Chapter 5.3: Vanadia-Containing Catalysts, pp. 460-479.
Canadian Application No. 2,765,273, Millennium Inorganic Chemicals, Inc., Office Action dated Apr. 17, 2013, 4 pages.
Elvers, Barbara et al. (Editors), Ullmanns' Encylcopedia of Industrial Chemistry, fifth, Completely Revised Edition, vol. A 23: Refractory Ceramics to Silicon Carbide, "Silica", SCM Chemicals Library 3901 Fort Armistead Road, Baltimore, MD 21226, Retrieved on Nov. 11, 1993, pp. 614-651.
Engelhardt G., et al., High-Resolution Solid-State NMR of Silicates and Zeolites "29S1 NMR of silicate solutions", (1987) pp. 75-103.
Grace Brochure, "Coatings Product Overview" W.R. Brace & Co., http://www.grace.com/EngineeredMaterials/ProductsAndApplications, (2006), pp. 1-2.
Iler R., The Chemistry of Silica, "The Silica-Water System," John Wiley & Sons, Inc., (1979), pp. 7-9.
Iler R., The Chemistry of Silica, Chapter 3 "Polymerization of Silica", John Wiley & Sons, Inc., (1979), pp. 172-289.
Iler R., The Chemistry of Silica, "The Silica-Water System," John Wiley & Sons, Inc., (1979), pp. 554-556.
International Search Report & Written Opinion dated Mar. 25, 2011, which issued in corresponding International Application No. PCT/IB2010/02236.
International Search Report and Written Opinion dated Jul. 1, 2011, which issued in corresponding International Application No. PCT/US2010/056485.
International Preliminary Report on Patentability dated Feb. 9, 2012, which issued in corresponding International Application No. PCT/IB2010/002236.
Ogbebor et al., "Physico-Mechanical Properties of Elastomers Based on Natural Rubber Filled with Silic and Clay" Association of the Chemical Engineers AchE—Chemical Industry & Chemical Engineering Quarterly CI&CEQ vol. 16, No. 4, pp. 373-378 (2010).
Solar et al., "Characterization of Denox Catalysts Supported on Titania/Silica", Catalysis Today, (1992), vol. 14, pp. 211-224.
Technical Bulletin Brochure, Fine Particles No. 11, Basic Characteristics of AEROSIL Fumed Silica, Degussa. Aerosil & Silanes, 3.2.1 Particle Size and Structure, pp. 21-23 (date unknown).
TiONA® DT-S10 Data Sheet, (May 21, 2007), 7 pages.
TiONA® DT-S58 Safety Data Sheet, (May 21, 2007), 7 pages.
Tokuyama Brochure, "Finesil®" Tokuyama: Product Information: Finesil, http://www.tokuyama.co.jp/eng/products/chem/si/finesil.html, pp. 1-2 (printed Sep. 17, 2012).
Written Opinion dated Feb. 9, 2012, which issued in corresponding International Application No. PCT/IB2010/002236.
Fedeyko et al., "Formation and Structure of Self-Assembled Silica Nanoparticles in Basic Solutions of Organic and Inorganic Cations", Langmuir, vol, 21, issue 11, pp. 5197-5206 (2005).
Wachs, et al., "Selective Catalytic Reduction of NO with NH over Supported Vandaia Catalysts", Journal of Catalysis, vol. 161, issue 1, pp. 211-221 (1996).
Wachs, I., et al., "Molecular Structure and Reactivity of the Group V Metal Oxides", Catalysis Today, vol. 78, issues 1-4, pp. 13-24 (2003).
Wachs, I., et al., "Catalysis Science of the Solid Acidity of Model Supported Tungsten Oxide Catalysts", Catalysis Today, vol. 116, No. 2, pp. 162-168 (2006).
English translation of Official Action issued in corresponding JP Application Serial No. 2012-522277, mailed Mar. 4, 2014.

* cited by examiner

SILICA-STABILIZED ULTRAFINE ANATASE TITANIA, VANADIA CATALYSTS, AND METHODS OF PRODUCTION THEREOF

CROSS-REFERENCE TO RELATED APPLICATIONS

This application is a divisional of U.S. application Ser. No. 12/533,414, filed Jul. 31, 2009, the entirety of which is incorporated herein by reference.

STATEMENT REGARDING FEDERALLY SPONSORED RESEARCH OR DEVELOPMENT

Not applicable.

BACKGROUND

The selective catalytic reduction (SCR) of nitrogen oxides produced during combustion processes using reductants such as $NH_3$ has been a commercially successful technology for over 30 years. It was originally introduced for the control of NOx emissions in exhaust gases from stationary power plants and other industrial facilities. Recently, interest in the technology has expanded as the result of its utility for treatment of emissions from mobile power sources, such as marine vessels, cars, trucks, and machinery. This increased interest is driven largely by regulations that govern emissions from mobile sources. For example, the US EPA regulations that will be effective in 2010 for mobile diesel engines set such low emissions levels for NOx that efficient exhaust after-treatment is essential, and SCR is a leading technological choice.

In stationary applications, the requirements on the catalyst are not very high. For example, stationary engines typically run at close to steady-state, constant temperature conditions, and with relatively low gas space velocity. Further, the volumetric requirements for the catalyst are not too demanding. In on-road mobile applications, however, the catalysts requirements are much more severe. In this case, engines are not run at steady-state or at constant temperature, but instead cycle over wide variations in load (and hence temperature). In one possible system configuration, the SCR catalyst is located downstream of a diesel particulate filter (DPF), and regeneration of the soot-loaded DPF can cause a high temperature pulse of hot gas to pass through the downstream SCR catalyst. Furthermore, the mobile applications typically involve much higher gas space velocities and the volumetric requirements on the catalyst are severe. For example, in early application of SCR applications to heavy-duty diesel engines, the catalyst volume was several times greater than the engine displacement! For these reasons, it is imperative that improved catalysts be developed that have higher thermal stability, and improved volumetric activity, so that cost-effective technological solutions can be found to meet increasingly strict regulations.

The technology that has been utilized for many years in stationary applications involves catalysts based on metal oxides, and especially those based on $TiO_2$ as the catalyst support, and the active catalytic functionality is based on vanadia, $V_2O_5$. Thus, mixtures of $TiO_2$ (80-95%), $WO_3$ (3-10%) and optionally with the balance comprising $SiO_2$ (such as DT-52™ and DT-58™) have been in use as the catalyst support, and the active vanadia component is typically present at 0.1 to 3 wt %. In these catalysts the titania is initially present with relatively high surface area in the anatase form. The use and limitations of vanadia-based catalysts for mobile urea-SCR systems are reviewed in "Studies in Surface Science and Catalysis", Granger, P. and Parvulescu, V. I., ed., Vol. 171, Chapter 9. There are two considerations that rely on greater stability of the vanadia-based catalyst. First, the catalysts may be used in mobile applications in a configuration where a diesel particulate filter (DPF) is positioned upstream of the vanadia-SCR catalyst. In this configuration, the vanadia catalyst may be exposed to extremes in temperature associated with the exothermic regeneration of the DPF. A second consideration is that it is desirable for a vanadia-based catalyst to maintain its catalytic activity at high temperatures (e.g., >550° C.) so as to better compete with base-metal exchanged zeolite catalysts, which show a high degree of stability and activity at high temperatures. DT-58™ contains 10 wt % $SiO_2$ 9 wt % $WO_3$ and 81% $TiO_2$, and has a surface area of about 90 $m^2/gm$. It is well known, however, that catalysts based on titania and vanadia are not particularly thermally stable. There are several reasons for this lack of thermal stability. First, the titania by itself tends to sinter at elevated temperature, with an associated loss of surface area. Second, the titania also undergoes a transformation to the rutile crystalline form at high temperatures, and this form is generally thought to be a less active support than the anatase form. Third, unsupported vanadia has a melting point of about 675° C., and so, even when it is supported on titania, at elevated temperatures it tends to be somewhat mobile and can eventually aggregate to form low surface area (and less active) vanadia crystals.

For these reasons, it is imperative to improve the thermal stability of the final catalyst, and at the same time, maintain or increase the catalytic activity for selective catalytic reduction of nitrogen oxides (SCR-DeNOx) from lean-burn mobile engines. Achieving both goals simultaneously is a significant challenge, since often one can be improved at the detriment of the other. For example, the incorporation silica and/or rare-earths into the titania is reported to increase stability, but further gains in both stability and activity are needed.

Amorphous silica-stabilized ultrafine anatase titania have previously been used in catalytic applications. It is known that amorphous silica improves the anatase phase stability and surface area retention of ultrafine anatase titania, and hence amorphous silica is an additive in commercial products like DT-58™ and DT-S10™, and these materials can be used commercially in selective catalytic control catalysis of diesel emissions, particularly for DeNOx applications.

An early patent describes the use of "silicic acid" to stabilize anatase titania for DeNOx (U.S. Pat. No. 4,725, 572). However, a careful reading of this patent shows that the silica source is in fact a colloidal, particulate silica. A more recent U.S. patent (U.S. Pat. No. 6,956,006 B1) also describes the use of colloidal silica to effect an anatase titania with enhanced thermal and hydrothermal stability. A recent published U.S. patent application (U.S. 2007/0129241 A1) discusses vanadia/titania-based DeNOx catalysts with improved stability. The silica source used therein is also a colloidal silica. However, these colloidal silica-based titania catalysts, as noted, lack stability and acceptable activity after extremes of high temperature. Titania catalysts which minimize these shortcomings would be of great use and advantage.

While the DT-58™ support material mentioned above is a state-of-the-art support material for diesel emission catalysts, an improved titanium support would, in general, be (1) more thermally stable, thus enabling its placement in closer proximity to the engine, and (2) more catalytically active, thus enabling use of a smaller canister (say 10 L vs. 12 L) for containing the catalyst, thus optimizing (reducing) the size of the emission control system.

It is to the production of such improved silica supported-titania substrates, and catalysts made therefrom, that the present invention is directed.

SUMMARY OF THE DISCLOSURE

The present disclosure describes compositions and processes for the production of stable ultrafine anatase titania for use, for example, as a support material for vanadia catalysts preferably for use in a catalytic emission control system. The stabilization involves treatment of the titania with a soluble, low molecular weight form and/or small nanoparticle form (<5 nm) of silica such as, in a preferred embodiment, a tetra(alkyl)ammonium silicate, such as tetramethylammonium silicate, or silicic acid, which serves to efficiently maintain the anatase phase and prevent sintering (crystal growth) under severe thermal and hydrothermal conditions, even in the presence of vanadia. The novel silica-stabilized titanias combined with vanadia have equal or improved catalytic activity for selective catalytic reduction of NOx compared to currently-available silica-titania based vanadia catalysts.

In one of its aspects, the invention is a catalyst support material which comprises anatase titania particles comprising ≥85 wt % dry weight of $TiO_2$ and ≤10 wt % dry weight of $SiO_2$, wherein the $SiO_2$ is substantially in a low molecular weight and/or small nanoparticle form. The catalyst support material may further comprise, for example, 3% to 10% $WO_3$ and may have a BET surface area of at least 80 $m^2$/gm. The catalyst support material may comprise ≥85% dry weight of $TiO_2$, 3%-9% of $SiO_2$, and 3%-9% dry weight of $WO_3$, for example. The $SiO_2$ may be present at a fractional monolayer value of less than 1.0 before the catalyst support material is sintered. The small nanoparticle form of the $SiO_2$ may comprise a diameter of <5 nm. The low molecular weight form of the $SiO_2$ may comprise a MW of <100,000. The $SiO_2$ may comprise silicon atoms which are substantially (e.g., >50%) in the $Q^3$, $Q^2$, $Q^1$ and $Q^0$ coordination environments. The $SiO_2$ may comprise patches which are substantially ≤5 nm deep after redistribution as seen by scanning electron microscopy or by transmission electron microscopy. The $TiO_2$ used may optionally not be prepared in the presence of urea.

In another aspect, the invention may be a vanadia catalyst comprising a silica-stabilized titania catalyst support material as described herein which comprises $V_2O_5$ disposed thereon. The vanadia catalyst may comprise, for example, 0.5% to 5% dry weight of $V_2O_5$ (or more preferably 1.0 to 3%). The $V_2O_5$ may be present at a fractional monolayer value of less than 1.0 before sintering. The vanadia catalyst may be sintered at ≥650° C. for example. In another aspect, the invention may be a diesel emission catalytic device comprising the vanadia catalyst as described herein. In another aspect the invention may be a diesel emission control system which comprises the diesel emission catalytic device described above and a diesel particulate filter, and wherein the diesel emission catalytic device is positioned upstream of or downstream of the diesel particulate filter.

In another one of its aspects, the invention is a method of catalyzing the conversion of nitrogen oxides to $N_2$ gas, comprising exposing engine emissions comprising NOx to the vanadia catalyst as described herein with an added reductant to produce $N_2$ and $H_2O$. The reductant may be for example $NH_3$ and/or urea. In the method the vanadia catalyst may comprise 0.5%-5% (or more preferably 1.0% to 3%) dry weight of $V_2O_5$, for example. The engine emissions may be passed through a diesel particulate filter before or after being exposed to the vanadia catalyst.

In another of its aspects, the invention is a method of producing a catalyst support material, comprising providing a slurry comprising $TiO_2$, combining the $TiO_2$ slurry with (1) a silica precursor solution comprising $SiO_2$ substantially in a low molecular weight form and/or $SiO_2$ comprising small nanoparticles and with (2) $WO_3$ to form a $TiO_2$—$WO_3$—$SiO_2$ mixture, wherein the silica precursor solution is combined with the $TiO_2$ slurry before, after, or while the $WO_3$ is combined with the $TiO_2$ slurry, and then washing and sintering the $TiO_2$—$WO_3$—$SiO_2$ mixture to form a silica-stabilized titania support material. In the method the silica-stabilized titania support material may comprise, for example, 86%-94% dry weight of $TiO_2$, 3%-9% dry weight of a $SiO_2$, and 3%-7% dry weight of $WO_3$, and the titania support material may primarily comprise a surface area of at least 80 $m^2$/gm before sintering. The $TiO_2$ of the slurry may comprise, for example, preformed titanium hydroxide, titanium oxy-hydroxide or titanium dioxide particles. Optionally, the $TiO_2$ of the slurry is not produced in the presence of urea. The small nanoparticle form of the $SiO_2$ of the silica precursor solution may substantially comprise a diameter of <5 nm. The low molecular weight form of the $SiO_2$ of the silica precursor solution may substantially comprise a MW of <100,000. The $SiO_2$ of the silica precursor solution may comprise silicon atoms which are substantially (e.g. >50%) in the $Q^3$, $Q^2$, $Q^1$ and $Q^0$ coordination environments. The silica precursor solution may comprise a tetra(alkyl)ammonium silicate solution or silicic acid. The $SiO_2$ may substantially comprise patches which are ≤5 nm in depth after redistribution as seen by scanning electron microscopy or by transmission electron microscopy. The method may further comprise combining the $TiO_2$—$WO_3$—$SiO_2$ mixture with $V_2O_5$ to form a vanadia catalyst. The vanadia catalyst thus formed may comprise, for example, 0.5% to 3% to 5% dry weight of $V_2O_5$. The $V_2O_5$ thereof may be present at a fractional monolayer value of less than 1.0 before sintering. The vanadia catalyst may be sintered at ≥650° C. for example.

In another aspect, the invention contemplates a method of producing a silica-stabilized titania catalyst support material by providing a $TiO_2$ slurry comprising $TiO_2$ particles, providing a particulate silica source, combining the $TiO_2$ slurry with the particulate silica source to form a $TiO_2$—$SiO_2$ mixture, and adjusting the $TiO_2$—$SiO_2$ mixture to a pH<8.5 and a temperature <80° C. wherein the particulate silica source is dissolved and reprecipitated on the $TiO_2$ particles to form the silica-stabilized titania catalyst support material. The method may further comprise the step of combining the silica-stabilized titania catalyst support material with $WO_3$ to form a silica-stabilized titania tungsten catalyst support material. The method may further comprise washing and sintering the silica-stabilized titania tungsten catalyst support material. The silica-stabilized titania tungsten catalyst support material may comprise, for example, 86%-94% dry weight of $TiO_2$, 3%-9% dry weight of a $SiO_2$, and 3%-7% dry weight of $WO_3$, and the titania support material may primarily comprise a surface area of at least 80 $m^2$/gm before sintering. The $TiO_2$ particles of the $TiO_2$ slurry may comprise, for example, preformed titanium hydroxide, titanium oxy-hydroxide or titanium dioxide particles. The $TiO_2$ particles of the $TiO_2$ slurry optionally are not produced in the presence of urea. The $SiO_2$ of the $TiO_2$—$SiO_2$ mixture, after dissolving, may comprise silicon atoms which are substantially (e.g., >50%) in the $Q^3$, $Q^2$, $Q^1$ and $Q^0$ coordination environments. The $SiO_2$ on the $TiO_2$ particles of the method may substantially comprise patches which are ≤5 nm in depth after redistribution of the $SiO_2$ as seen by scanning electron microscopy or by transmission electron microscopy. The method may further comprise combining the $TiO_2$—$WO_3$—$SiO_2$ mixture with $V_2O_5$ to form a vanadia catalyst. In the method, the vanadia catalyst may comprise, for example, 0.5%-3% dry weight of $V_2O_5$. The $V_2O_5$ of the vanadia catalyst may be present at a fractional monolayer value of less than 1.0 before sintering, and the vanadia catalyst may be sintered at ≥650° C.

Other aspects of the invention will become evident upon consideration of the description below.

DETAILED DESCRIPTION OF THE INVENTION

Figure 1:
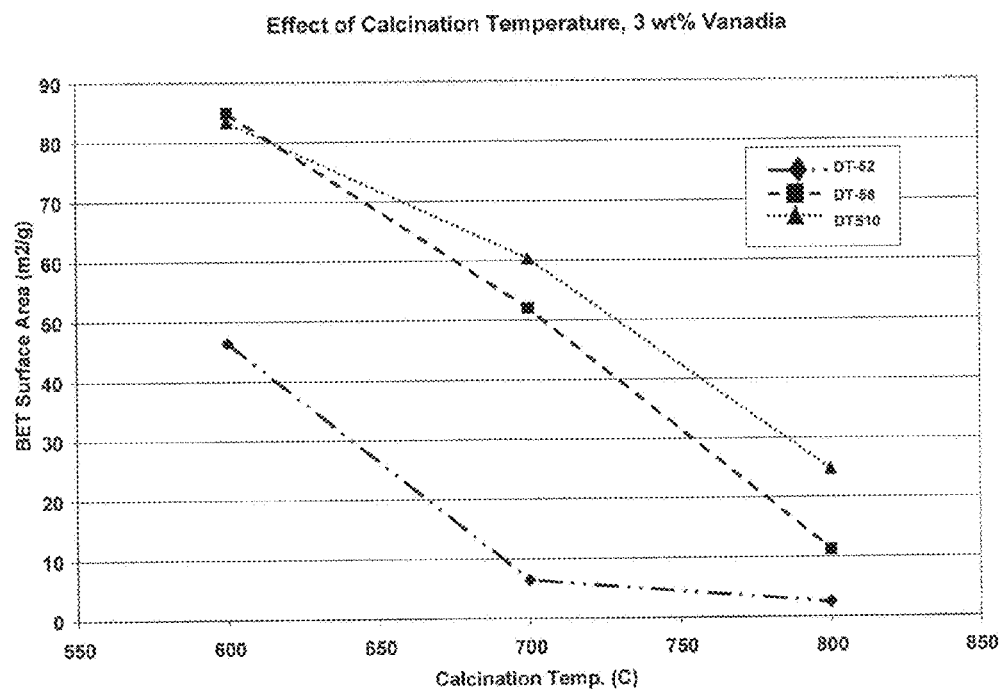
FIG. 1 is a graph showing the effect of calcination temperature on surface area of vanadia catalyst.

A primary goal of the present invention is production of a stable, high surface area titania support material in anatase crystal form, primarily to be used as a support for vanadia ($V_2O_5$) in diesel emission control catalyst applications. The stabilization involves treatment of the titania with silica in a low molecular weight form and/or small nanoparticle form, such as a soluble precursor tetra(alkyl)ammonium silicate (i.e., tetramethylammonium silicate) or tetraethylorthosilicate (TEOS). Other examples of low molecular weight silica precursors which may be used in the present invention include, but are not limited to aqueous solutions of silicon halides (i.e., anhydrous $SiX_4$, where X=F, Cl, Br, or I), silicon alkoxides (i.e., $Si(OR)_4$, where R=methyl, ethyl, isopropyl, propyl, butyl, iso-butyl, sec-butyl, tert-butyl, pentyls, hexyls, octyls, nonyls, decyls, undecyls, and dodecyls, for example), other silicon-organic compounds such as hexamethyldisilazane, fluoro-silicic acid salts such as ammonium hexafluorosilicate [$(NH_4)_2SiF_6$], quaternary ammonium silicate solutions (e.g., $(NR_4)n$, $(SiO_2)$, where R=H, or alkyls such as listed above, and when n=0.1-2, for example), aqueous sodium and potassium silicate solutions ($Na_2SiO_3$, $K_2SiO_3$, and $MSiO_3$ wherein M is Na or K in varying amounts in ratio to Si), silicic acid $Si(OH)_4$ generated by ion exchange of any of the cationic forms of silica listed herein using an acidic ion-exchange resin (e.g., ion-exchange of the alkali-silicate solutions or quaternary ammonium silicate solutions).

The term "low molecular weight form" of silica refers to a silica species having a molecular weight (MW) of less than about 100,000. The term "small nanoparticle form" refers to silica particles having diameters <5 nm.

The emphasis on thermal/hydrothermal stability improvement for vanadia-based catalysts is relatively new since this segment of the mobile emission control market is just developing. It was only after extensive characterization by the inventor of traditional catalysts that it was recognized that optimization of the vanadia-based catalysts required that (1) overall silica level needed to be minimized, and that (2) the soluble, low molecular weight and/or small nanoparticle form, forms of silica were most effective towards providing the requisite stability and activity.

The catalytic support materials of the present invention have exceptional retention of the anatase phase of titania and surface area after severe thermal and/or hydrothermal treatments, even in the presence of vanadia. The compositions and methods of manufacture of the invention use low molecular weight and/or small nanoparticle forms of silica to obtain an exceptional ultrafine anatase titania phase and surface area stability, while the finished vanadia catalyst demonstrates equal or improved catalytic activity for vanadia-based selective catalytic reduction of NOx after accelerated aging. Such compositions and methods have been previously unknown in the art.

Two key aspects of the present invention that differentiate it over the prior art involve the nature of the amorphous silica and the manner in which it is incorporated into the titania.

With regard to the nature of the amorphous silica, it is first necessary to make the distinction between particulate forms of amorphous silica, and solution- or gas-phase forms that consist of very low molecular weight amorphous silicate monomers or clusters that are not considered to be in particulate form or comprise very small nanoparticles. The suitable forms of silica for the present invention are described herein and referred to as low molecular weight and/or small (<5 nm) nanoparticle silica. Two references that describe the types of amorphous silica are "Ullmann's Encyclopedia of Industrial Chemistry, Fifth ed., Vol A23, pp. 583-660, (1993) and "The Chemistry of Silica", R. K. Iler, 1979. For example, one form of particulate amorphous silica is colloidal silica or silica sol. This type of silica consists of suspensions of dense, discrete amorphous silica particles that have diameters in the size range between about 5 nm and 100 nm. In this size range, the particles typically scatter visible light and thus form turbid to opaque suspensions. These particles can also typically be analyzed by visible light scattering methods using commonly available commercial instruments. As will be seen from the examples below, without further modification, colloidal silica in particulate form (>5 nm) is not a suitable form of silica for the present invention. One reason that this form of silica is not desirable (without subsequent modification) according to the present invention is that most of the mass of the silica in the particle is in the interior, and is not available at the surface to interact with the substrate titania. Thus, according to Iler (op cit., p. 8), an amorphous silica particle with a diameter of 5 nm has 1500 silicate atoms, and 37% of these silicate atoms are on the particle surface, whereas a particle of 1 nm has almost all the silicate atoms on the surface. Thus, for the purposes of the present invention, it is desirable to use silica sources which substantially comprise particles which have diameters <5 nm and/or which have low molecular weights for example wherein the MW<100,000, and hence are available for interaction with the titania. An exception, as will be described below, involves subsequent modification of particulate silica using conditions of pH and temperature wherein the particle silica has been dissolved and re-precipitated onto the titania surface.

Where used herein the term "substantially" is intended to mean that more than 50% of the process or material in question has the particular characteristic or condition to which is being referred.

For example, as noted above, in the present invention the catalyst support material, in a preferred embodiment comprises silica which is substantially in a low molecular weight form and/or a small nanoparticle form. By this is meant that over 50% of the silica is either in the low molecular weight form (MW<100,000) or in a small nanoparticle from (diameter <5 nm), or is a combination of both. In a more preferred version the silica comprises >60% low molecular weight forms and/or small nanoparticle forms. In a still more preferred version the silica comprises >70% low molecular weight and/or small nanoparticle forms. In a still more preferred version the silica comprises >80%, and yet still more preferred, >90%, low molecular weight forms and/or small nanoparticle forms of silica.

Furthermore, the low molecular weight and small nanoparticle forms of the present invention preferably have geometric surface areas of >450 $m^2/g$.

Particulate forms of silica (i.e., wherein diameter is >5 nm) include silica gel, precipitated silica and fumed silica. While the primary particles of dense, amorphous silica in these particulate forms can be very small (e.g., 2.5 nm), the primary particles are irreversibly agglomerated together to form much larger secondary particles that can range in size from hundreds of nanometers to many microns in diameter. These secondary particles obviously do not have a large portion of the silicate atoms near the surface and available for interaction with the titania. Of course, these secondary particles are easily analyzed using the visible light scattering methods, and when maintained in suspension, the particles are quite opaque. Particulate silica in any of these forms, without subsequent modification, is also not suitable for the present invention.

One class of silica precursor that is suitable for the present invention is the highly alkaline solutions, referred to as the water soluble silicates. These are described in Iler (op cit., Chapter 2). These solutions are typically transparent since the silica particles, if present, are generally too small to scatter visible light. However, depending on the silica concentration and alkalinity, small particles of silica can form in these solutions. Iler (op cit., p. 133) estimates that for a $SiO_2$:$Na_2O$ molar ratio of 3.1, the average number of $SiO_2$ units per particle in dilute solutions is about 900, which is less than the 1500 silicate units in the 5 nm particle described above. Such a silicate precursor, even though it may contain some nanoparticles above about 5 nm, is suitable for the present invention since most of the mass of the silica is in the form of smaller, low molecular weight species. The alkali silicates are not the most preferable form for the present invention, however, because residual alkali ions such as Na are extremely effective catalyst poisons for vanadia-based SCR catalysts.

Recently, the nature of amorphous silica nanoparticles in alkaline solutions has been examined in more detail by Fedeyko, et. al., ("Langmuir", 2005, 21, 5197-5206). These authors used a variety of techniques, including small-angle x-ray scattering (SAXS) and small-angle neutron scattering (SANS). These methods are able to detect the presence of nanoparticles down to about 2 to 3 nm in size. The authors showed that in dilute solution, when [OH]/[$SiO_2$] is less than about 1, the silica forms small nanoparticles, while for [OH]/[$SiO_2$] greater than 1, the silica is present as monomers and oligomers that are too small to be detected in the scattering experiments. It is the latter type of amorphous silica species, mostly too small to be easily detected by visible light and x-ray scattering methods, that are referred to as low molecular weight and/or small nanoparticle amorphous silica in the present invention, and these are the preferred forms of silica for the present invention.

One useful means of characterizing the silica monomers and oligomers in solution is $^{29}Si$ nuclear magnetic resonance (see, for example, Chapter 3 in the book "High Resolution Solid-State NMR of Silicates and Zeolites" by G. Engelhardt and D. Michel, 1987). The method can provide information on the usual tetrahedral coordination environment around Si, and in particular, whether or not the Si contains one or more Si next nearest neighbors (linked by bridging oxygens). Notation that is commonly used to describe this coordination is as follows: $Q^0$ refers to a central Si with no next nearest Si neighbors, i.e., $Si(OH)_4$; $Q^1$ refers to a central Si with one next nearest Si neighbors, i.e., $Si(OH)_3(OSi)_1$; $Q^2$ refers to a central Si with two next nearest Si neighbors, i.e., $Si(OH)_2(OSi)_2$; $Q^3$ refers to a central Si with three next nearest Si neighbors, i.e., $Si(OH)_1(OSi)_3$; and $Q^4$ refers to a central Si with four next nearest Si neighbors, i.e., $Si(OSi)_4$.

Without being bound by theory, it is believed that in order to be used directly (without subsequent treatment to change the form of silica) it is desired to use silicate solutions that consist predominantly of $Q^0$ to $Q^3$ oligomers. On the other hand solutions of silicate oligomers that consist almost entirely of $Q^4$ species are not desired for the present invention. Conceptually, it is reasoned that for the latter types of silicate oligomers, much of the silica is completely surrounded by other silicate species and hence is unavailable for reaction with the titania surface, where it is most needed to stabilize the anatase.

One form of silica that is suitable for use in the present invention is the commercially available alkaline solution tetramethylammonium silicate. Insight can be gained into the nature of this solution based on earlier research. Engelhardt and Michel (op cit. p. 92) describe the $^{29}Si$ nuclear magnetic resonance study of a 1M solution of $SiO_2$ (approximately 6 wt %) with TMA/Si=1.0, which is roughly equivalent to a TMAOH concentration of 9 wt %. In this solution, the silica is primarily in the form of a cubic octamer that contains 8 silicon atoms, and these have $Q^3$ coordination. This small species represents about 90% of the mass of the silica. The actual TMA-silicate solution used in the examples of the present invention has a somewhat higher concentration of silica (9 wt %) and lower concentration of TMAOH (7 wt %) and so the distribution of silicate species is somewhat different than the above literature report as shown in Table 6, below.

Another form of silica that is suitable for the present invention is "silicic acid". This type of silica is described in Iler (op cit., Chapter 3). A more detailed characterization of silicic acid is accomplished using the $^{29}Si$ nuclear magnetic resonance characterization, as described in G. Engelhardt and D. Michel (op cit. p. 100). This form of silica can be made by acidification of alkali silicate solutions, for example by ion-exchange using acidic ion exchange resins.

Fractional Monolayer Concept.

It is of interest to show that the compositions and methods of the present invention are different from prior art examples, and one means of doing so involves the notion of fractional monolayer coverage of the substrate surface with an added oxide. In the definitions below, the subscript x denotes the added oxide of interest, e.g., silica.

$C_x$=Surface area-basis amount of added oxide for perfect monolayer coverage, $g/m^2$;
SA=Surface area of mixed oxide;
$M_x$=Mass basis amount of added oxide for perfect monolayer coverage; g/g mixed oxide;
$L_x$=Actual loading of added oxide on mixed oxide, g/g;
$FM_x$=Fractional monolayer of added oxide on aged mixed oxide;
TFM=Total fractional monolayer on aged mixed oxide.

$$M_x = C_x * SA \quad \text{(Eqn 1)}.$$

$$FM_x = L_x / M_x \quad \text{(Eqn. 2)}$$

$$TFM = Sum(FM_x) \quad \text{(Eqn. 3)}$$

First, it was necessary to establish a best estimate for the monolayer coverage of perfectly well-dispersed added oxides on the substrate titania or similar oxides, C. For vanadia, the literature value for monolayer coverage of the supported oxide is 7-8 V atoms/$nm^2$, which corresponds to 1,100 micrograms $V_2O_5/m^2$. (see I. E. Wachs, et al., 2003). For tungsta, the literature value of 4.5 W atoms/$nm^2$ was used (I. E. Wachs, 2006), which corresponds to 1700 microgram $WO_3/m^2$. For silica, the literature value of 600 microgram $SiO_2/nm^2$ was obtained (Iler, p. 36, op cit.). Thus, as an example, a mixed oxide consisting of 10 wt % $SiO_2$ (0.10 g/g), 9 wt % $WO_3$ (0.09 g/g) and 2 wt % $V_2O_5$ (0.02 g/g) with the balance $TiO_2$, has a measured $N_2$ BET surface area of 250 $m^2/g$. The TFM for this material is TFM=(1/250)*((0.10/600E-6)+(0.09/1700E-6)+(0.02/1100E-6))=0.95.

This number indicates that were the added $SiO_2$, $WO_3$ and $V_2O_5$ oxides perfectly well dispersed on the titania surface, the surface coverage of the final, mixed oxide would be 0.95 monolayers thick with the added oxides. With respect to silica alone, the fractional monolayer coverage would be 0.67, or two-thirds of the surface would be covered with an ideally dispersed silica coating. The compositions of the present invention, when freshly prepared (i.e., after the addition of the added oxides but before aging or sintering) typically have surface areas greater than about 100 $m^2/g$ and a total amount of added oxides of 15 wt % or less, and so the fractional monolayer coverage is about 1.0 or less, and the fractional monolayer coverage specifically for silica is about 0.80 or less.

Methods of Silica Incorporation for the Present Invention.

The surface coating of titania using alkali silicates or silicic acid such as described above has been practiced industrially for many years in the paints and coatings industry. See, for example, the review chapters 52 and 53 in the "Colloidal Silica, Fundamentals and Applications", Surfactant Science Series Vol. 131, H. E. Bergna, W. O. Roberts, eds. (2006). As described in Ch. 52 of Bergna and Roberts, one approach to coating the titania surface with silica involves exposing the substrate titania particles to silica under alkaline conditions with a concentration of silica that is below the solubility limit for amorphous silica. As described in Ch. 53 of Bergna and Roberts, another method involves exposing the substrate titania surface to monosilicic acid at low pH at a silica concentration that is again very low and below the solubility limit. While the methods for silica incorporation in the above references represent suitable means of incorporating silica according to the present invention, there are several important differences. One difference is that for the prior art, the phase of titania that is used as the substrate is rutile (because of its higher light scattering power than anatase), and there is no suggestion of the ability of silica addition via those methods for the prevention of anatase phase conversion to rutile. A second important difference is that the substrate titania particles of the paints and coatings prior art, regardless of whether they are anatase or rutile, are relatively low surface area substrates, with $N_2$ BET surface areas of the substrate surface typically being less than about 15 $m^2/g$. Third, a key difference is in the surface coverage of the added oxide such as silica. With the above definition of fractional monolayer coverage, the compositions of the present invention, if they were prepared on a low surface area support (15 $m^2/g$) would have total fractional monolayer of about 5 or greater, and the fractional monolayer coverage specifically for silica would be about ≥3. Thus, in the prior art, the silica coating is present over the entire titania particle, and with a thickness that exceeds the thickness of a monolayer. Indeed, the silica coating is present so as to completely inactivate the photo-catalytic activity of the titania surface. Finally, in a preferred embodiment of the present invention, the titania is coated with silica under conditions where the added silica is well above the solubility limit of a few hundred ppm. As will be seen below, in the present invention the silica, when it is deposited initially, does not completely cover the titania surface, so that the desirable catalytic functionality of the titania surface for the SCR reaction is still available. Hence, the goal of the present invention of maximizing the catalytic activity of the surface can then be met, while preserving the stability of the support.

There is one more reason why particulate silicas are not the preferred forms of silica for the present invention, including forms of particulate silica with internal porosity and hence high pore volume. It is well know from the literature (e.g., Wachs et al., *J. Cat.* 161, 211-221 (1996)) that silica, by itself, is not a good support for vanadia SCR catalysts, while titania and tungsta-doped titania are good supports. Hence, for the present invention, it is desirable to minimize the amount of silica surface area that is available to adversely interact with vanadia, while maximizing the amount of $TiO_2/WO_3$ surface area, so as to make the most active catalyst. Thus, only enough silica is used to stabilize the titania, and it is used in a form (molecularly dispersed on the titania surface) that has minimal adverse impact on the vanadia catalyst.

Finally, another approach to make the materials of the present invention, wherein the particulate forms of silica described above can be used, is now described. It is well known that particulate amorphous silica is soluble to an extent that depends on solution pH and temperature, see for example Iler, (op cit., p. 42). Above about pH 9 and for temperatures higher than ambient temperature, amorphous silica will appreciably dissolve. This dissolved silica can then be precipitated again, for example onto a titania surface, by subsequently lowering the temperature and/or pH to a region that has lower silica solubility. In this manner, particulate silicas that are finely mixed with anatase titania can be dissolved and redistributed in a well-dispersed manner onto the titania surface via the hydrothermal treatment. However, such a post-treatment is not a preferred method of making the compositions of the present invention, since this step adds processing time and cost during the mixed oxide manufacture. It is most preferred to use a suitable silica precursor and treat the titania directly.

EXAMPLES

Titania Starting Material

In one embodiment of the present invention, a sulfated titania slurry (see Table 1) was used. Such a sulfated titania slurry can be obtained as an intermediate product in a production process for making titanium dioxide using the sulfuric acid process, for example as produced by the MIC production facility in Thann, France. Such a slurry comprises about 27% of a high surface area, hydrous anatase titania, $TiO_2$. The $TiO_2$ has primary crystallite particles having sizes of less than 5 nanometers, and corresponding $N_2$ BET surface areas in excess of 250 $m^2/g$. The slurry has a viscosity of 0.5-3 poises, a density of 1275 $kg/m^3$, and a low pH of around 1.5-2.0, which results from the fact that the slurry contains about 6.6 wt % $SO_3$. However, the present invention is not restricted to use of this slurry. Any composition comprising hydrous anatase titania could be used herein. Indeed, it is not necessary to use a sulfated titania slurry as the starting material. A dried low-sulfate anatase titania precursor could be used instead.

TABLE 1

Composition of Sulfated Titania Slurry

| Type | Method | Unit | Specification |
| --- | --- | --- | --- |
| Residue on Calcination | $TiO_2$ 43 Drying then calcination on 1000° C. | % (weight) | 27 ± 1 |
| Iron | $TiO_2$.15 X-Ray Fluorescence | Mg/kg | ≤80 |
| $SO_3$ | G1.3 S Analyzer/Dryness 105° C. | % (weight) | 6.6 ± 1 |
| $P_2O_5$ | $TiO_2$.16 X-Ray Flou | % (weight) | ≤0.4 |
| Na | $TiO_2$.47 Atomic Absorption | % (weight) | ≤0.05 |
| K | $TiO_2$.5 X-Ray Fluorescence | % (weight) | ≤0.01 |
| Pb | $TiO_2$.13 X-Ray Fluorescence | % (weight) | ≤0.01 |
| Peak Height | G1.2 Diffraction X | Degree | ≥1 |
| Rutile | $TiO_2$.48 Diffraction X | | None detected |
| Specific Area | G1.1 B.E.T. | $M^2/g$ | ≥250 |

*Statistical values

Preferably however, the titania slurry used herein is produced with titania which has not been produced in the presence of urea.

In an embodiment of the invention, the $TiO_2$ component of the catalyst support material used herein substantially comprises a surface area <400 $m^2/g$ and a pore volume <0.40 $cm^3/g$.

Experimental Methods: The structure and stability of titania-based catalysts and the changes that occur during exposure to elevated temperatures were investigated by various means. The methods employed consist of x-ray diffraction analysis (XRD), transmission electron microscopy (TEM), SEM (scanning electron microscopy), high resolution solid-state nuclear magnetic resonance spectroscopy (NMR), nitrogen porosimetry ($N_2$ BET/BJH) and catalytic evaluation of activity for the reaction of NO with $NH_3$ (DeNOx)

XRD: Samples were evaluated for crystal phase composition and crystallite size in the following manner. The samples were prepared for XRD by pressing into spherical XRD PW1812/00 holders and then analyzed using a Panalytical X'Pert Pro™ diffractometer equipped with a sealed Cu x-ray tube and an X-Celerator position sensitive detector. Instrument conditions were set at 45 kV, 40 mA, 0.008°2Θ/step and 50 second dwell time. Phase identifications are performed through search-match of the experimental patterns with both the ICCD and ICSD databases. The Rietveld method was applied for Quantitative Phase Analysis by X-Ray diffraction. The crystallite size was measured on the single peaks from Scherrer formula as employed in the Panalytical High Score software. The Scherrer's formula depends on the fact that crystallite size is inversely related to the full width at half maximum (FWHM) of an individual peak—the more narrow the peaks, the larger the crystallite size. The instrument broadening value used for calculation was from LaB6 standard (NIST profile standard material). In addition, the full profile method such as Rietveld Analysis, found in X'Pert High-Score Plus™ software in addition used for calculated grain size as well.

TEM: The samples were prepared for TEM analysis by dipping wholey carbon coated Cu TEM grids directly into the provided powder. The grids were then viewed in the TEM at magnifications ranging from 50 to 400,000×. Analysis was performed using a JEOL 2000FX II TEM operated at 200 kV. During the imaging process particular attention was given to characterizing phase size and distribution. Images were collected with a Gatan MultiScan™ CCD camera and are in jpeg format.

SEM: The samples were prepared for SEM analysis by dispersing the provided powder onto Al SEM stubs covered in colloidal graphitic carbon. SEM analysis was conducted using a JEOL 7401 at 2 kV without conductive coating.

$^{29}$Si NMR Spectroscopy Characterization of Samples. $^{29}$Si Magic angle spinning nuclear magnetic resonance spectroscopy ($^{29}$SIMASNMR) is a useful way of characterizing the coordination of silica in silica-containing solid samples (see, for example, Engelhardt and Michel, 1987 (op cit.)) as described above. A problem with $^{29}$Si MASNMR spectroscopy is, however, that the $^{29}$Si nucleus is present at low natural abundance (4.7%), and so the method is not very sensitive. A common method for increasing the sensitivity is the cross-polarization approach (see for example "The Colloid Chemistry of Silica", H. Bergna, ed., ACS Series 234, p. 270 (1994)). In this technique, spin polarization from a more abundant spin that has a large nuclear magnetic moment (in this case, $^{1}$H) is transferred via double resonance to a less abundant spin ($^{29}$Si). This method has the effect of dramatically increasing the sensitivity for the $^{29}$Si NMR signal when the Si has (OH) connected to it. It is well known that in the silicates, silicon adopts tetrahedral coordination and is surrounded by four oxygen nearest-neighbors, and then either H or Si next-nearest-neighbors. An isolated silicate tetrahedron that sits on the titania surface would be expected to have at least one H next-nearest-neighbor, Si—OH, and this proton should increase the sensitivity of the method for the silicon nucleus. $^{29}$Si NMR spectroscopy can also be performed on liquid samples that contain soluble, low molecular weight silicates, as also described in Engelhardt and Michel (op cit.).

$N_2$ Porosimetry: Samples were evaluated for nitrogen porosimetry using Micromeretics TriStar™ units. The samples were outgassed overnight at 150° C. under flowing nitrogen. They were then cooled to room temperature for the adsorption measurement. Adsorption/desorption curves were measured at liquid nitrogen temperature. Surface area was determined using the BET method, and pore volumes were measured using the BJH method on the adsorption branch.

The vanadia was added by impregnation of either an alkaline solution (e.g., monoethanolamine) or from acidic (e.g., oxalic acid) solution. The impregnated materials were then aged at high temperature in hydrothermal environment (750° C. for 16 hr in 10% $H_2O$) (or at 600° C.-900° C. for 6 hr in an air atmosphere) in order to cause accelerated aging. It is desirable to have 100% anatase with high surface area (associated with very small crystallites), and no crystalline tungsta after the age treatments.

Examples 1-3

Benchmarking of Commercial Materials

In the following three examples, we sought to benchmark the performance of several commercial prior art materials that are used in SCR applications, DT-52™ (Example 1), DT-58™ (Example 2) and DT-S10™ (Example 3). Properties for these three materials are listed in Table 2. It can be seen that DT-52™ contains added tungsta (but not silica), DT-S10™ contains added silica (but not tungsta) and DT-58™ contains both added tungsta and silica.

TABLE 2

Target Properties of Commercial Materials

| | | Material | | |
|---|---|---|---|---|
| Property | Unit | DT-52 | DT-58 | DT-S10 |
| $WO_3$ | wt % | 10.0 | 9.0 | 0.0 |
| $SiO_2$ | wt % | 0.0 | 10.0 | 10.0 |
| $TiO_2$ | wt % | Balance (90) | Balance (81) | Balance (90) |
| Surface Area | m$^2$/g | 90 | 110 | 110 |
| Crystal Phase | | Anatase | Anatase | Anatase |

For each of Examples 1-3, the base materials were used as received, and vanadia was loaded onto them in the following way. A solution of monoethanolamine (MEA) in deionized water was prepared that was 0.4 M (24.4 g/L MEA). To this solution was added 10.9 g/L $V_2O_5$, (0.06 M). In order to prepare a catalyst with a final vanadia loading of 1 wt %, approximately 13.7 g of the above solution was mixed with 15.8 g of the titania support (loss on ignition=5 wt %), and the mixture was heated in a rotary evaporator under vacuum at 75° C. until dry. The resulting product as then calcined in a static muffle furnace at a temperature of 600° C., 700° C. or 800° C. Similarly, catalysts were prepared with a final vanadia loading of 3 wt % by using 41.2 g of the MEA/vanadia solution and 15.8 g titania.

The materials prepared above were then evaluated for $N_2$ porosity, phase composition and crystal size by XRD and for DeNOx activity (results are given in Table 3). For the DeNOx activity, a 0.1 g sample of each vanadia-loaded catalyst sample was pelletized and meshed to −20/+40 mesh, and was loaded into a reactor to determine the conversion of NO in the presence of $NH_3$. A flowing stream that contained 5% $O_2$, 1000 ppm $NH_3$, 1000 ppm NO, and 3% $H_2O$ was passed over the catalyst at a space velocity of 650 l/g.cat-hr.

TABLE 3

Characterization of Comparison Examples for Commercial Materials

| | Description | | | $N_2$ Porosimetry | | XRD | | | | | | DeNOx |
|---|---|---|---|---|---|---|---|---|---|---|---|---|
| | | | | Surface | Pore | | Anatase | | Rutile | | Tungsta | Conv. |
| Example | Support | % $V_2O_5$ | Temp., C. | Area (m$^2$/g) | Volume (Cm$^3$/g) | % Anatase | Crystal Size (A) | % Rutile | Crystal Size (A) | % $WO_3$ | Crystal Size (A) | (%) at 325 C. |
| 1 | DT-52 | 1 | 600 | 63 | 0.29 | 100.0 | 212 | 0.0 | 0 | 0.0 | 0 | 37 |
| 1 | DT-52 | 1 | 700 | 43 | 0.27 | 100.0 | 291 | 0.0 | 0 | 0.0 | 0 | 72 |
| 1 | DT-52 | 1 | 800 | 8 | 0.04 | 90.7 | 1084 | 0.0 | 0 | 9.3 | 185 | 46 |
| 1 | DT-52 | 3 | 600 | 46 | 0.25 | 97.8 | 275 | 0.0 | 0 | 2.2 | 85 | 99 |
| 1 | DT-52 | 3 | 700 | 6 | 0.03 | 83.9 | 1380 | 6.9 | 2044 | 9.2 | 286 | 36 |
| 1 | DT-52 | 3 | 800 | 2 | 0.01 | 56.6 | 1898 | 34.9 | 2044 | 8.9 | 340 | 19 |
| 2 | DT-58 | 1 | 600 | 93 | 0.29 | 100.0 | 146 | 0.0 | 0 | 0.0 | 0 | 26 |
| 2 | DT-58 | 1 | 700 | 80 | 0.33 | 100.0 | 168 | 0.0 | 0 | 0.0 | 0 | 33 |
| 2 | DT-58 | 1 | 800 | 54 | 0.31 | 100.0 | 249 | 0.0 | 0 | 0.0 | 0 | 52 |
| 2 | DT-58 | 3 | 600 | 85 | 0.32 | 100.0 | 165 | 0.0 | 0 | 0.0 | 0 | 58 |
| 2 | DT-58 | 3 | 700 | 52 | 0.24 | 97.8 | 284 | 0.0 | 0 | 2.2 | 0 | 55 |

TABLE 3-continued

Characterization of Comparison Examples for Commercial Materials

| | Description | | | N₂ Porosimetry | | XRD | | | | | DeNOx |
| | | | | Surface | Pore | Anatase | | Rutile | | Tungsta | Conv. |
| Example | Support | % V₂O₅ | Temp., C. | Area (m²/g) | Volume (Cm³/g) | % Anatase | Crystal Size (A) | % Rutile | Crystal Size (A) | % WO₃ | Crystal Size (A) | (%) at 325 C. |
|---|---|---|---|---|---|---|---|---|---|---|---|---|
| 2 | DT-58 | 3 | 800 | 11 | 0.06 | 83.7 | 1217 | 8.8 | 1952 | 7.6 | 669 | 34 |
| 3 | DTS10 | 1 | 600 | 91 | 0.40 | 100.0 | 165 | 0.0 | 0 | 0.0 | 0 | 15 |
| 3 | DTS10 | 1 | 700 | 88 | 0.40 | 100.0 | 171 | 0.0 | 0 | 0.0 | 0 | 9 |
| 3 | DTS10 | 1 | 800 | 78 | 0.38 | 100.0 | 192 | 0.0 | 0 | 0.0 | 0 | 12 |
| 3 | DTS10 | 3 | 600 | 83 | 0.37 | 100.0 | 169 | 0.0 | 0 | 0.0 | 0 | 48 |
| 3 | DTS10 | 3 | 700 | 60 | 0.31 | 100.0 | 254 | 0.0 | 0 | 0.0 | 0 | 36 |
| 3 | DTS10 | 3 | 800 | 25 | 0.14 | 93.8 | 1170 | 6.2 | 2014 | 0.0 | 0 | 34 |

Visual inspection of Table 3 confirms trends reported in the literature, and that is that higher vanadia loadings and higher temperatures are associated with loss of surface area, conversion of anatase phase to rutile, crystallization of tungsta, and increase in crystal size (sintering). The individual materials, however, respond differently from one another. As examples, data for the 3 wt % vanadia samples are plotted in FIG. 1 (BET surface area) and FIG. 2 (% anatase phase), which are indicators of the thermal stability of the catalysts.

Figure 2:
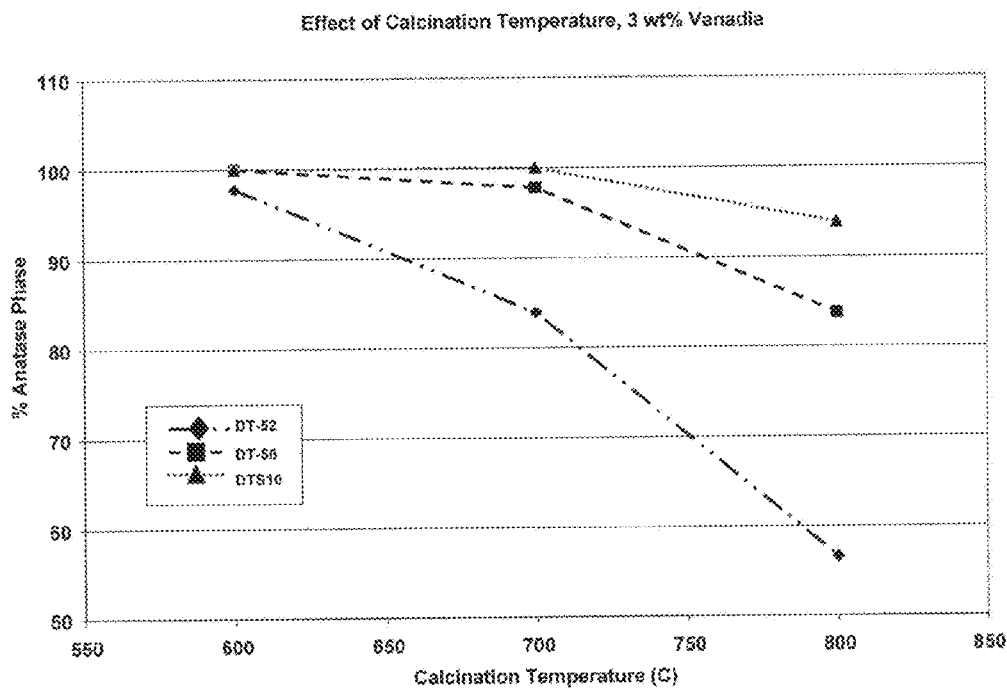
FIG. 2 is a graph showing the effect of calcination temperature on the percentage of anatase phase of titania in vanadia catalysts.

It can be clearly seen from these Tables 1 and 2 and FIGS. 1 and 2 that DT-S10™ (with silica) has the highest thermal stability, followed by DT-58™ (with silica and tungsta), followed by DT-52™ (with tungsta only). If thermal stability were the only requirement for a good vanadia catalyst support, then DT-S10™ would be the clear choice.

Figure 3:
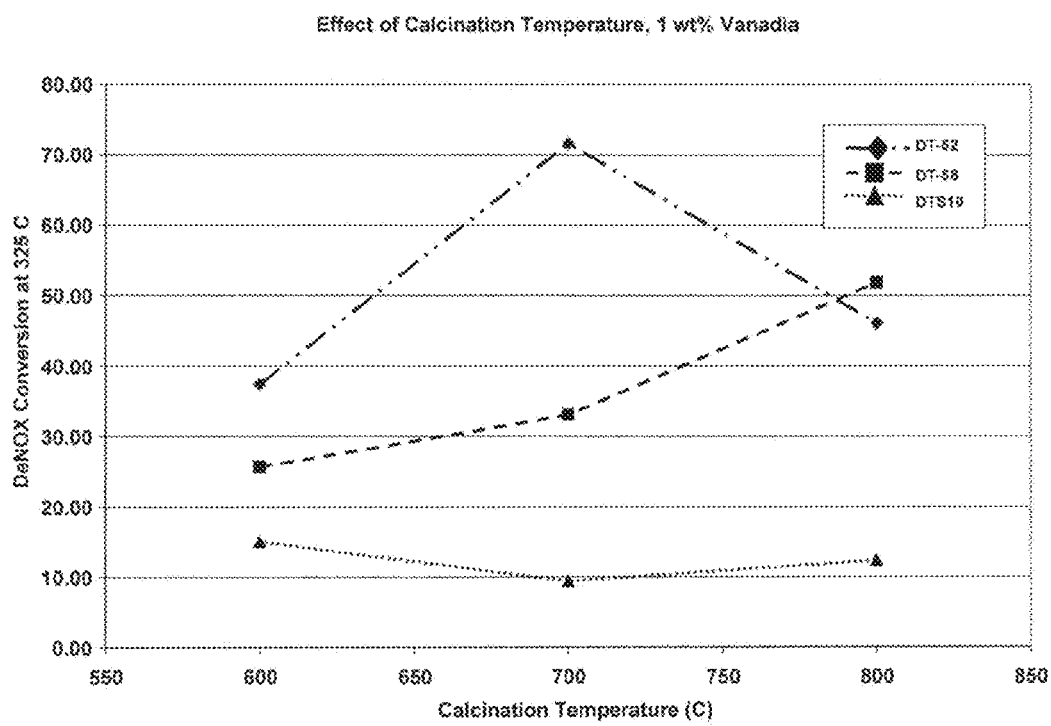
FIG. 3 is a graph showing the effect of calcination temperature on DeNox activity of 1% vanadia catalysts.
Figure 4:
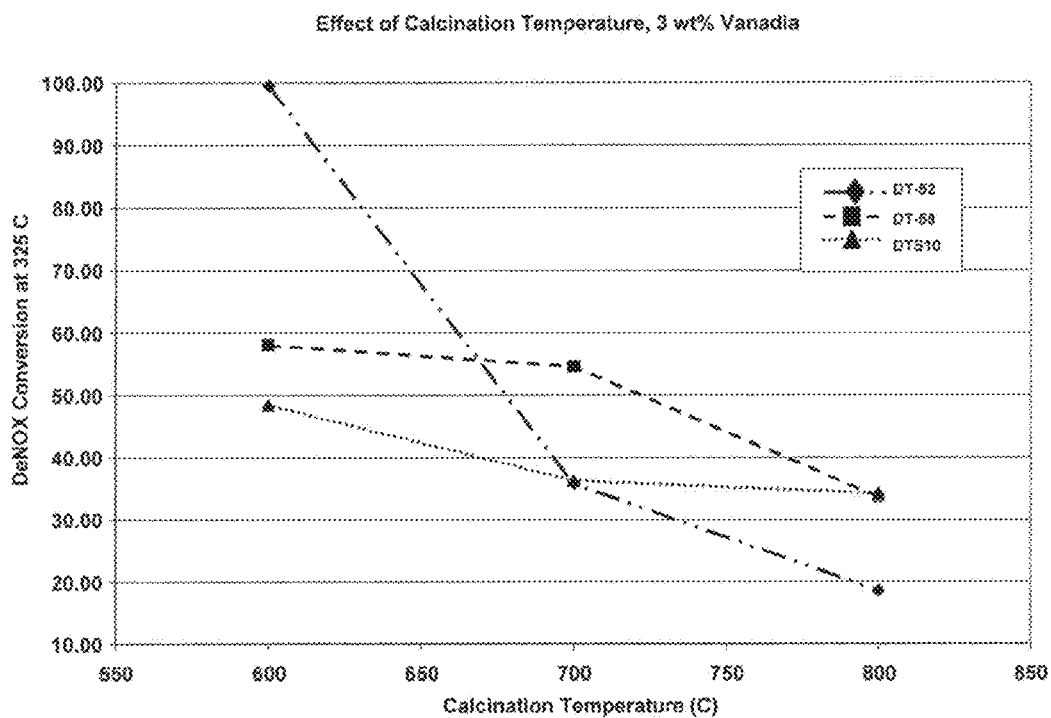
FIG. 4 is a graph showing the effect of calcination temperature on DeNOx conversion of 3% vanadia catalysts.

Shown in the next two figures (FIGS. 3 and 4) are the DeNOx conversions at 325° C. for the materials loaded with 1% and 3% vanadia, respectively. It can be clearly seen that the sample with silica only (DT-S10™) has the lowest conversion for most aging temperatures; it is only the sample with 3% vanadia, aged at 800° C., that has activity equal to that of DT 58™.

Thus, based on the performance of these commercial samples, there is an obvious need for develop a catalyst with both improved stability and activity.

Examples 4-5

The following examples reveal the performance of two additional commercial prior art materials (MIC DT-60™ and Tayca Corporation ITAC 115GS™) in relation to DT-58™. Samples of these materials were analyzed for composition using x-ray fluorescence analysis, with results shown in Table 4.

TABLE 4

Compositions of Materials

| Oxide, wt % | DT58 | MIC DT60 | Tayca |
|---|---|---|---|
| TiO₂ | 80.5 | 84 | 84.2 |
| WO₃ | 9.1 | 5.3 | 5.2 |
| SiO₂ | 9.8 | 10.3 | 10.2 |
| SiO₃ | 0.4 | 0.2 | 0.2 |

The results show that the DT-60™ and Tayca™ samples contain nominally about 10 wt % SiO₂ and about 5 wt % WO₃. All three types of materials were loaded with 0.9 wt % V₂O₅ using deposition from MEA solution as in Examples 1-3. The products were then aged at 800° C. for 6 hrs in air in a static muffle furnace, and the products were analyzed using the N₂ BET method. For the DeNOx activity, (micro-reactor), a 0.1 g sample of each vanadia-loaded catalyst sample was pelletized and meshed to −20/+40 mesh, and was loaded into a reactor to determine the conversion of NO in the presence of NH₃. A flowing stream that contained 5% O₂, 1000 ppm NH₃, 1000 ppm NO, and 3% H₂O was passed over the catalyst at a space velocity of 650 l/g.cat-hr.

The surface area stability of the samples is compared below in Table 5.

TABLE 5

Surface Areas of Commercial Samples

| Sample | Surface Area (m²/g) |
|---|---|
| DT58 ™ | 45.9 |
| DT60 ™ | 53.3 |
| Tayca ™ | 51.5 |

Figure 5:
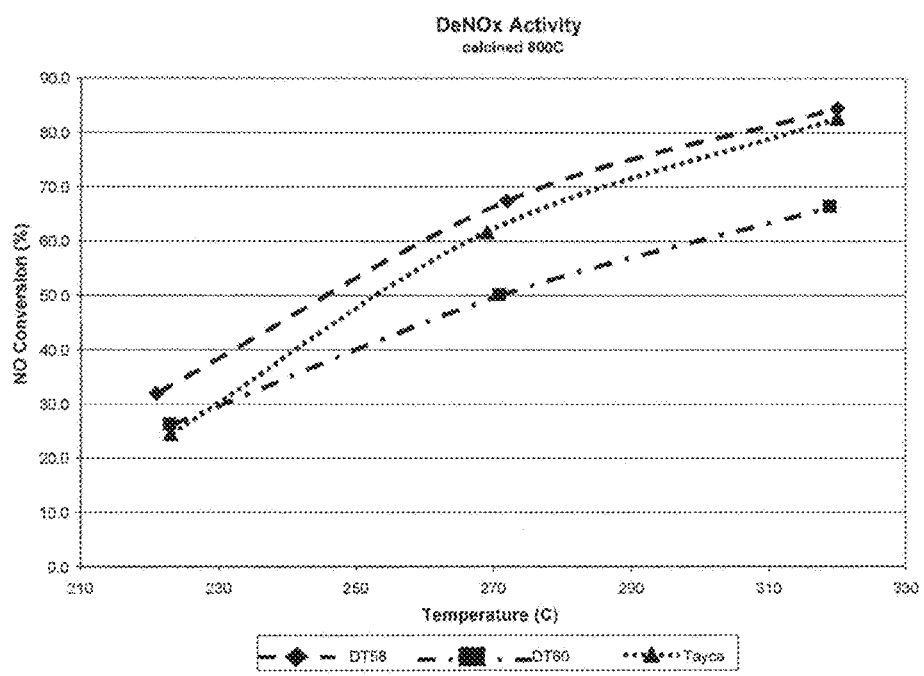
FIG. 5 is a graph showing the effect of temperature on DeNOx activity of various vanadia catalysts.

The data show that the samples with lower tungsta level have slightly greater stability than does DT-58™. However, the DeNOx activities of the catalysts, as shown in FIG. 5, shows that the activity for the DT-60™ and Tayca™ samples is lower than that for the DT-58™ sample. Thus, as for Examples 1-3, the Examples 4 and 5 demonstrate the need for greater stability and activity for the novel materials of the present invention.

Example 6

Silica Surface Stabilization

As noted elsewhere herein, the present invention is directed to providing a very stable ultrafine titania using a minimal amount of silica additive. As noted above, particulate silicas (e.g., colloidal, fumed, and precipitated) are not ideal sources of silica for use in titania-supported vanadium catalysts, because much of the silica is not available to interact with the titania surface. A goal of the present invention was to find another form of silica that could be used to more effectively stabilize the surface of the titania, but that would have a minimal adverse impact on the catalytic activity of vanadia supported on the surface of the titania.

The use of silica in low molecular weight and/or small nanoparticle form was considered, rather than in the particulate form which is present in the conventional amorphous silicas described above. The lowest molecular weight form of silica in aqueous solution is silicic acid, $Si(OH)_4$. However, this chemical entity has a very low solubility in water, and therefore is restricted to concentrations of a few hundred ppm. (Discussions of the aqueous chemistry of silica in water, are found for example, in Iler, (op cit.) and Brinker, C. J and Scherer, G. W, 1990, Chapter 3).

In view of the low solubility of $Si(OH)_4$, we turned to experimentation with tetra(alkyl)ammonium silicate solutions (including, but not limited to, tetramethylammonium, TMA). These reagents contain silica in low molecular weight forms (see Engelhardt and Michel, op cit.). Furthermore, the silica in these solutions is present at fairly high concentrations (e.g., 9 wt % $SiO_2$). Thus, we considered whether or not the molecular entities in these solutions may be small enough to react selectively with the titania surface, while not providing separate area for vanadia to bond which would diminish its catalytic activity.

$^{29}Si$ NMR Spectroscopy of a Liquid Sample of Soluble Silicate.

In order to determine the nature of the silicate species in commercially available TMA silicate solution, the commercial source of TMA silicate used in these examples (Alfa TMA-silicate, 9% $SiO_2$) was evaluated using $^{29}Si$ NMR spectroscopy on a 400 MHz instrument by Spectral Data Services, Inc. Shown in Table 6 are the results.

TABLE 6

Q Forms of TMA Silicate Solutions and Titania Solids

| Description | $Q^0$ | $Q^1$ | $Q^2$ | $Q^3$ | $Q^4$ |
|---|---|---|---|---|---|
| Alfa TMA Silicate (Liquid) | 4 | 17 | 39 | 23 | 16 |
| Example 6 (Solid) | 0 | 4 | 16 | 50 | 30 |
| Example 14 (Solid) | 11 | 5 | 34 | 44 | 6 |

It can be seen that the TMA silicate solution contains mostly silica species with connectivity of $Q^3$ or lower. However, there is some silica with $Q^4$ connectivity, so the solution does not contain all of the silica in the ideal form (connectivity of $Q^3$ or lower). However, as will be shown herein, we have made the novel discovery that the soluble silica sources such as tetra(alkyl)ammonium silicates can be used to make exceptionally stable (anatase phase, high surface area) vanadia-based catalysts that exhibit excellent catalytic activity for selective catalytic reduction of NOx reactions.

Stability Improvement Via Novel Silica Treatment.

The Examples 1-5 above reveal the stability and catalytic performance of commercial materials loaded with vanadia and subjected to accelerated aging conditions. Example 6 demonstrates the improvement in thermal stability that can be attained using the novel silica treatment method of the present invention. A slurry of production-made sulfated titania hydrogel was diluted to a $TiO_2$ content of 21.6 wt %. 112.5 g of this slurry was added to a round-bottom flask that was equipped with an overhead stirrer. This slurry was heated to a temperature of 60° C. via a temperature controlled heating mantle, and was maintained at that temperature throughout the preparation. To this slurry was added 33.3 g of tetramethylammonium silicate (TMA-$SiO_2$, Alfa-Aesar, 9% $SiO_2$, TMA/$SiO_2$=0.5). This mixture was allowed to react for 20 min. The pH was then adjusted up to 6.0 via the addition of concentrated $NH_4OH$ (29%). 3.07 g of ammonium paratungstate (APT) was then added, and the final pH was adjusted to 6.5 with addition of more concentrated $NH_4OH$. This mixture was allowed to react an additional 30 min, and was then filtered, rinsed with DI water, and dried. The final nominal composition of this product on an oxide basis was 81 wt % $TiO_2$, 10 wt % $SiO_2$ and 9 wt % $WO_3$. It was then divided into portions which were calcined over the temperature range of 600° C. to 900° C. for 6 hr in air using a static muffle furnace. A sample of production DT-58™ of the same composition was also aged under identical conditions. Both samples were evaluated for retention of surface area using the BET method, with data shown in FIG. 6.

Figure 6:
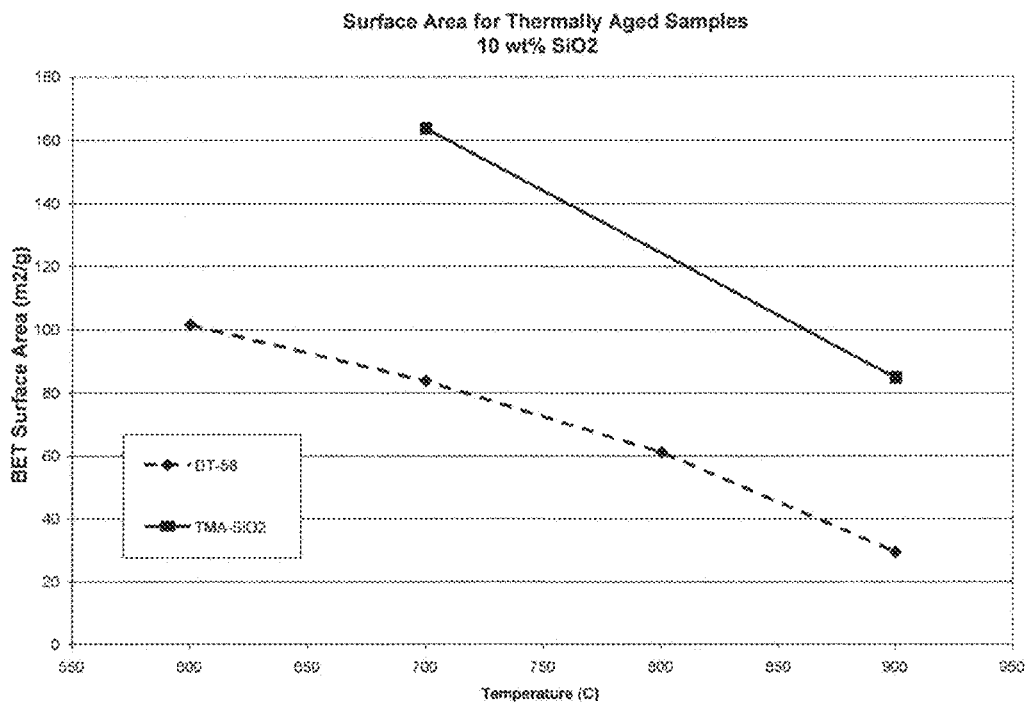
FIG. 6 is a graph showing the effect of temperature on surface area of a catalyst support of the present invention versus a conventional catalyst support.

The data in FIG. 6 clearly show that while the compositions of the two products are nominally the same, the sample prepared using the novel low molecular weight and/or small nanoparticle form of silica of the present invention is much more thermally stable (retains surface area to a greater extent) than the prior art material (DT-58™).

$^{29}Si$ MASNMR Spectroscopy Characterization of Solid Samples. The following analysis of the TMA-$SiO_2$ material of the invention and the conventional material (DT-58™) shows that the silica is present in a very different morphology for the materials of the present invention. The two samples, in their "fresh" state (before addition of vanadia but after calcination at 500° C.) were analyzed in detail by Spectral Data Services, Inc., using $^{29}Si$ MASNMR spectroscopy on a 270 MHz instrument. An attempt was made to run the DT-58™ sample with cross-polarization, but no signal was observed after 1 hr, and under these conditions, a large signal would have been seen if there were any (OH) groups near the Si nucleus as would be expected for well dispersed silica on the surface of the titania. Hence, this sample was run for 4 hrs using just the MASNMR method. A weak signal was observed at −111 ppm relative to tetramethylsilane. This signal is consistent with Si in a $Q^4$ environment, or $Si(OSi)_4$. Hence, both observations (the lack of a cross-polarization signal and the presence of the $Q^4$ signal) in the NMR experiment are consistent with particulate silica where most of the Si is in the interior of the silica particle, and there are not many Si(OH) groups on the surface of the silica.

The sample of novel catalyst support was run under nominally the same NMR conditions, and this sample also contained 10 wt % $SiO_2$, however, the source of the silica was TMA-$SiO_2$, which contains low molecular weight and/or small nanoparticle forms of silica In this case, a strong signal was observed in the $^1H$-$^{29}Si$ cross-polarization experiment, which demonstrates that there are hydroxyl groups attached to the Si. This supports the idea that the silica that is well dispersed on the titania surface in the present invention. Furthermore, the spectrum was deconvoluted into four peaks, with the following positions and relative intensities −110 ppm, 30%; −100 ppm, 50%; −90 ppm, 16%; and −82 ppm (4%), and these peaks are assigned the coordinations $Q^4$, $Q^3$, $Q^2$ and $Q^1$, respectively, as shown in Table 6. It can be seen, then that about 70% of the silica is in a coordination environment ($Q^3$, $Q^2$ and $Q^1$) such that hydroxyl groups are the next-nearest-neighbors, and this further supports the notion that the silica is well dispersed on the titania surface. Thus, we conclude that the use of the low molecular weight and/or small nanoparticle silica precursor, such as TMA-$SiO_2$ or other compositions described herein gives rise to silica that is well dispersed on the titania surface. In particular, a preferred coordination environment of the silicon atoms of the titania support of the present invention is substantially (at least 50%) $Q^3$, $Q^2$, $Q^1$ and $Q^0$ coordinations, as determined by $^{29}Si$ CP-MASNMR. One key manifestation of this difference in the nature of the silica is that the well-dispersed silica is much more effective, on a mass basis, towards stabilizing the titania. Therefore, less silica is necessary to stabilize the titania when the silica is well-dispersed on the titania surface.

Figure 7:
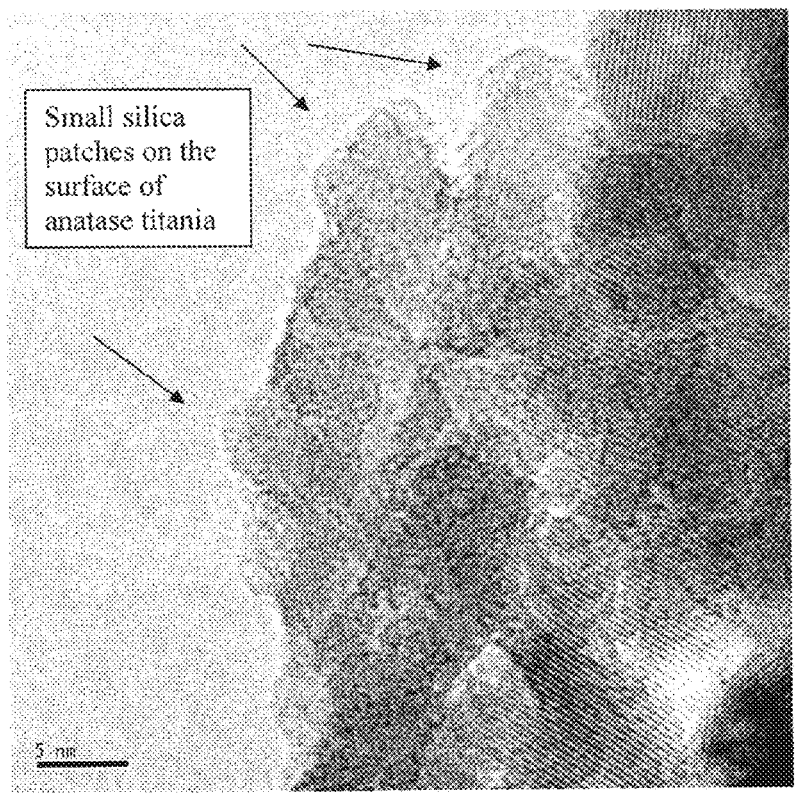
FIG. 7 is a transmission electron micrograph (TEM) of a silica-tungsta-titania catalyst of Example 6 showing two-dimensional patches of silica <2 nm in depth on the titania surface.

In order to further evaluate the nature of the silica coating on the novel sample, it was subjected to TEM analysis, as shown in FIG. 7 which reveals that the silica is present as isolated patches on the anatase titania surface. The patches exhibit two-dimensional character in that the length is typically less than 5 nm while the depth (distance away from the titania surface) is typically less than 2 nm.

Example 7

Stability and Activity Advantage of 90:4:6 $TiO_2:SiO_2:WO_3$.

The following example of the invention demonstrates the stability and activity benefit for materials produced according to the methods of the present invention. A slurry of production-made sulfated titania hydrogel was diluted to a $TiO_2$ content of 21.6 wt %. 208.3 g of this slurry was added to a round-bottom flask that was equipped with an overhead stirrer. This slurry was heated to a temperature of 60° C. via a temperature controlled heating mantle, and was maintained at that temperature throughout the preparation. (In an embodiment of the invention the titania slurry and silica component used herein are mixed at a temperature <80° C. and at a pH<8.5. Alternatively, the titania slurry and silica component used herein may be mixed at a temperature <70° C. and at a pH<7.0.) 3.4 g of ammonium paratungstate (APT, 88% $WO_3$) was then added and allowed to react for 30 min. To this mixture was added 22.2 g of the tetramethylammonium silicate of Example 6 and the mixture was allowed to react for 10 min. The pH was then adjusted up to 6.5 via the addition of concentrated $NH_4OH$ (29%). This mixture was allowed to react an additional 20 min, and was then filtered, rinsed with DI water, and dried at 105° C. and then calcined at 500° C. for 6 hr. The final nominal composition of this product on an oxide basis was 90 wt % $TiO_2$, 4 wt % $SiO_2$ and 6 wt % $WO_3$. To this powder was deposited vanadia from an MEA solution, as in Examples 1-3, above, so that the final loading was 2 wt % $V_2O_5$ on a total oxide basis. A portion of the dried powder was then heated to 750° C. and held at that temperature for 16 hr in an air atmosphere that contained 10 wt % $H_2O$.

Example 8

Stability and Activity Advantage of 90:5:5 $TiO_2:SiO_2:WO_3$

This example further demonstrates the stability and activity benefit for materials according to the present invention. A slurry of production-made sulfated titania hydrogel was diluted to a $TiO_2$ content of 21.6 wt %. 208.3 g of this slurry was added to a round-bottom flask that was equipped with an overhead stirrer. This slurry was heated to a temperature of 60° C. via a temperature controlled heating mantle, and was maintained at that temperature throughout the preparation. 2.8 g of ammonium paratungstate (APT, 88% $WO_3$) was then added and allowed to react for 30 min. To this mixture was added 27.8 g of tetramethylammonium silicate (TMA-$SiO_2$, 9% $SiO_2$,) and the mixture was allowed to react for 10 min. The pH was then adjusted up to 6.5 via the addition of concentrated $NH_4OH$ (29%). This mixture was allowed to react an additional 20 min, and was then filtered, rinsed with DI water, and dried at 105° C. and then calcined at 500° C. for 6 hr. The final nominal composition of this product on an oxide basis was 90 wt % $TiO_2$, 5 wt % $SiO_2$ and 5 wt % $WO_3$. To this powder was deposited vanadia from MEA solution as in Examples 1-3, above, so that the final loading was 2 wt % $V_2O_s$ on a total oxide basis. A portion of the dried powder was then heated to 750° C. and held at that temperature for 16 hr in an air atmosphere that contained 10 wt % $H_2O$.

In order to form a basis set for comparison, 4 different samples of DT-58™ were loaded with 2 wt % vanadia as above, and hydrothermally aged under the sample conditions. Results from these four samples were then averaged.

The materials from Examples 7 and 8, along with the DT-58™ reference materials, were analyzed by XRD, $N_2$ Porosimetry and DeNOx activity, with results shown in Table 7, below. In order to evaluate the materials for DeNOx applications, a 0.1 g sample of each vanadia-loaded and aged catalyst sample was pelletized and meshed to 20/+40 mesh, and was loaded into a reactor to determine the conversion of NO in the presence of $NH_3$. A flowing stream that contained 5% $O_2$, 500 ppm $NH_3$, 500 ppm NO, and 10% $H_2O$ was passed over the catalyst at a space velocity of 650 l/g.cat-hr. For each of the Example 7 and 8 materials, two DeNOx runs were performed. A total of 10 runs were obtained on the four DT-58™ reference materials. Results are reported in two ways. First, the conversion of NO is reported. A second method involves calculation of the "rate" of reaction. As persons of ordinary skill are aware, the SCR reaction is generally thought to be first order with respect to NO and zero order with respect to $NH_3$, and under these conditions, the reaction rate is proportional to —ln(1−x), where x is the fractional conversion (% conversion/100). Reaction rate is a better method of comparing samples at high conversions. Basic statistics were computed from the data, and analysis of variance demonstrated that the materials of the present invention gave significantly different ("P" value for the null hypothesis <0.05) and higher activity than the reference samples.

TABLE 7

Characterization of Samples by XRD $N_2$ Porosimetry and DeNOx Activity

| | | DT-58* | Example 7 | Example 8 |
|---|---|---|---|---|
| XRD-Phase | % Anatase | 95.4 | 100.0 | 100.0 |
| | % Rutile | 2.3 | 0.0 | 0.0 |
| | % $WO_3$ | 2.3 | 0.0 | 0.0 |
| XRD-Crystal Size (Å) | Anatase | 391 | 233 | 333 |
| | Rutile | 89 | 0 | 0 |
| | $WO_3$ | 498 | 0 | 0 |
| $N_2$ PSD | BET Surface Area (m²/g) | 34.9 | 47.5 | 30.6 |
| | BJH Pore Volume (cm³/g) | 0.25 | 0.29 | 0.24 |
| NO Conversion, % | 250° C. | 19.4 | 26.7 | 31.5 |
| | 350° C. | 64.0 | 72.6 | 78.8 |
| | 450° C. | 73.1 | 80.2 | 82.4 |
| NO Rate, % | 250° C. | 0.22 | 0.31 | 0.38 |
| | 350° C. | 1.04 | 1.30 | 1.57 |
| | 450° C. | 1.34 | 1.62 | 1.75 |

*Average of 4 samples

Table 7 clearly shows that the samples made according to the present invention (Examples 7 and 8) retain a greater portion of the anatase phase, resist crystallization of tungsta, and resist crystal growth (i.e., demonstrate less sintering) than the base materials. Furthermore, the materials of the present invention retain higher surface area and pore volume than do the reference materials. Finally, the materials made according to the present invention exhibit higher catalytic activity for the SCR reaction.

In the following two examples (9 and 10), the dramatic difference in stability and activity between catalysts made with a particulate (colloidal) silica versus the inventive materials is demonstrated.

Example 9

A novel material of the present invention was prepared in the following way: A slurry of production-made sulfated titania hydrogel (comprising 27% $TiO_2$, 7% sulfate, and $H_2O$) was diluted with water to give a 21.7 wt % $TiO_2$ dispersion. 207.7 g of this dispersion was heated with stirring over 20 minutes to 60° C., and 2.3 g ammonium paratungstate (APT-88% $WO_3$) was then added at low pH. The APT was allowed to react for 20 min. 44.4 g of the soluble, low molecular weight form of silica tetramethyl-ammonium (TMA) silicate (Alfa Aesar-9 wt % $SiO_2$) was then added and allowed to react for another 20 min. The pH was then adjusted to about 6.5 by the addition of concentrated $NH_4OH$ (this step could be performed prior to addition of $WO_3$). The slurry was then filtered, washed free of ammonium sulfate and then dried and calcined at 500° C. for 6 hr in air. The nominal composition of this base material was 8 wt % $SiO_2$, 4 wt % $WO_3$ and 88% $TiO_2$ ($TiO_2$: $SiO_2$: $WO_3$=88:8:4).

Example 10

A comparison sample was made using conventional particulate colloidal silica in the following way: A slurry of production-made sulfated titania hydrogel (27% $TiO_2$) was diluted with water to give a 21.6 wt % $TiO_2$ dispersion. 203.7 g of this dispersion was heated with stirring to 60° C., and 2.3 g ammonium paratungstate (APT-88% $WO_3$) was then added. The APT was allowed to react for 20 min. 13.3 g of the particulate, colloidal silica AS-30 (W. R. Grace-30 wt % $SiO_2$) was then added and allowed to react for another 20 min. As will be recognized by a person of ordinary skill in the art, this form of colloidal silica is stabilized with $NH_4^+$ ion rather than $Na^+$ ion, since the latter is a catalyst poison for the SCR reaction. The pH of the mixture was then adjusted to 6.5 by the addition of concentrated $NH_4OH$. The slurry was then filtered, washed and dried and calcined at 500° C. for 6 hr in air. The nominal composition of this base material is 8 wt % $SiO_2$, 4 wt % $WO_3$ and the 88% $TiO_2$. Thus, the materials of both Example 9 and Example 10 have nominally the same overall composition (88:8:4-$TiO_2$:$SiO_2$:$WO_3$) on an oxide basis.

To these two base materials comprising titania, silica, and tungsten was added vanadia to a target of 2 wt % $V_2O_5$. The vanadia was added by impregnation of an alkaline MEA solution. The impregnated materials were then aged at high temperature in hydrothermal environment (750° C. for 16 hr in 10% $H_2O$) in order to cause accelerated aging. The aged samples were evaluated by x-ray diffraction analysis, and the observed diffraction patterns were analyzed by Rietveld analysis. In order to evaluate the Example 9 and Example 10 materials for DeNOx applications, a 0.1 g sample of each vanadia-loaded and aged catalyst sample was pelletized and meshed to −20/+40 mesh, and was loaded into a reactor to determine the conversion of NO in the presence of $NH_3$. A flowing stream that contained 5% $O_2$, 500 ppm $NH_3$, 500 ppm NO, and 10% $H_2O$ was passed over the catalyst at a space velocity of 650 l/g.cat-hr. NO conversion and rate data are reported as described above.

TABLE 8

Characterization of Samples

| | | DT-58* | Example 9 | Example 10 |
|---|---|---|---|---|
| XRD-Phase | % Anatase | 95.4 | 100.0 | 91.2 |
| | % Rutile | 2.3 | 0.0 | 6.1 |
| | % $WO_3$ | 2.3 | 0.0 | 2.7 |
| XRD-Crystal Size (A) | Anatase | 391 | 200 | 1863 |
| | Rutile | 89 | 0 | NM |
| | $WO_3$ | 498 | 0 | 268 |
| $N_2$ PSD | BET Surface Area ($m^2/g$) | 34.9 | 54.2 | 8.1 |
| | BJH Pore Volume ($cm^3/g$) | 0.25 | 0.26 | 0.04 |
| NO Conversion, % | 250° C. | 19.4 | 20.1 | 8.4 |
| | 350° C. | 64.0 | 64.6 | 34.0 |
| | 450° C. | 73.1 | 70.8 | 33.2 |
| NO Rate, % | 250° C. | 0.22 | 0.22 | 0.09 |
| | 350° C. | 1.04 | 1.04 | 0.42 |
| | 450° C. | 1.34 | 1.23 | 0.40 |

*Average of 4 samples

The results in Table 8 again demonstrate the dramatic benefit in anatase phase stability (and resistance to sintering) offered by the materials of the present invention, the benefit in retention of surface area associated with the inventive materials, and the activity advantage associated with the present invention (Example 9) relative to the sample made with colloidal silica (Example 10).

Figure 8:
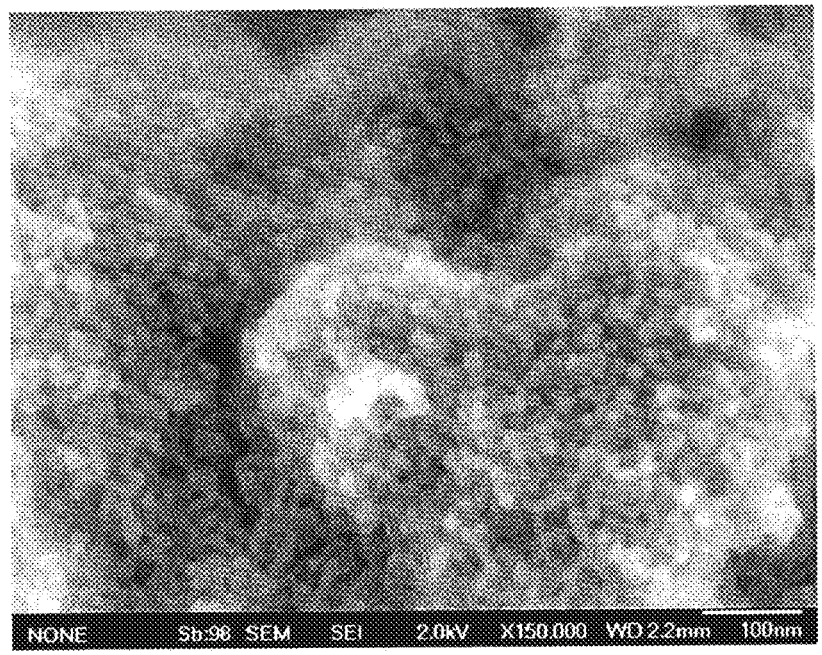
FIG. 8 is a scanning electron micrograph of a vanadia-titania catalyst of Example 10 showing ~20 nm colloidal silica particles disposed thereon.
Figure 9:
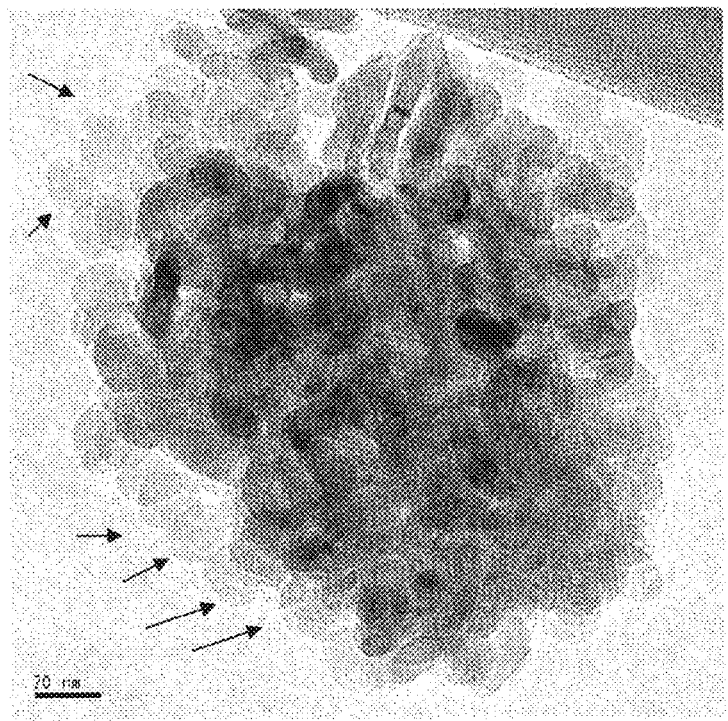
FIG. 9 is a transmission electron micrograph (TEM) of a catalyst showing ~20 nm colloidal silica particles on the outer surface of the vanadia-titania catalyst of Example 10.

The vanadia loaded and aged catalyst from Example 10 was evaluated using SEM (FIG. 8) and TEM (FIG. 9) microscopy. The images clearly show the presence of particulate colloidal silica particles having diameters of about 20 nm coating the underlying ~100-200 nm diameter vanadia-anatase titania particles.

Example 11

This example demonstrates another embodiment of the present invention and it involves dissolution of particulate silica followed by re-precipitation of a surface coating of silica onto the titania via hydrothermal treatment at elevated pH. A slurry of production-made sulfated titania hydrogel was diluted to a $TiO_2$ content of 21.6 wt %. 833.3 g of this slurry was added to a round-bottom flask that was equipped with an overhead stirrer. This slurry was heated to a temperature of 60° C. via a temperature controlled heating mantle, and was maintained at that temperature throughout the preparation. 13.6 g of ammonium paratungstate (APT, 88% $WO_3$) was then added and allowed to react for 20 min. The pH was then adjusted up to 6.0 via the addition of concentrated $NH_4OH$ (29%). To this mixture was added 80 g of a dispersion of fumed silica (Cabot M-S, 10% $SiO_2$ in DI water) and the mixture was allowed to react for 20 min. The pH was then adjusted up to 9.0 via the addition of concentrated $NH_4OH$ (29%), and this slurry was heated at reflux for 6 hr. It was then slowly cooled to precipitate the soluble silica, filtered, rinsed with DI water, and dried at 105° C. and then calcined at 500° C. for 6 hr. The final nominal composition of this product on an oxide basis was 90 wt % $TiO_2$, 4 wt % $SiO_2$ and 6 wt % $WO_3$ (90:4:6). Under these conditions, the fractional monolayer coverage of the silica on the titania is well below 1.0. To this powder was deposited vanadia from MEA solution as in Examples 1-3, above, so that the final loading was 2 wt % $V_2O_5$ on a total oxide basis. A portion of the dried powder was then heated to 750° C. and held at that temperature for 16 hr in an air atmosphere that contained 10 wt % H20.

The catalyst material from Example 11 was analyzed by XRD, $N_2$ Porosimetry and DeNOx activity and TEM. In order to evaluate the material for DeNOx applications, a 0.1 g sample of each vanadia-loaded and aged catalyst sample was pelletized and meshed to −20/+40 mesh, and was loaded into a reactor to determine the conversion of NO in the presence of $NH_3$. A flowing stream that contained 5% $O_2$, 500 ppm $NH_3$, 500 ppm NO, and 10% $H_2O$ was passed over the catalyst at a space velocity of 650 l/g.cat-hr. Results are shown in Table 9.

TABLE 9

Characterization of Samples

|  |  | DT-58* | Example 11 |
|---|---|---|---|
| XRD-Phase | % Anatase | 95.4 | 100.0 |
|  | % Rutile | 2.3 | 0.0 |
|  | % $WO_3$ | 2.3 | 0.0 |
| XRD-Crystal Size (A) | Anatase | 391 | 309 |
|  | Rutile | 89 | 0 |
|  | $WO_3$ | 498 | 0 |
| $N_2$ PSD | BET Surface Area ($m^2/g$) | 34.9 | 30.3 |
|  | BJH Pore Volume ($cm^3/g$) | 0.25 | 0.21 |
| NO Conversion, % | 250° C. | 19.4 | 30.6 |
|  | 350° C. | 64.0 | 77.6 |
|  | 450° C. | 73.1 | 83.5 |
| NO Rate, % | 250° C. | 0.22 | 0.36 |
|  | 350° C. | 1.04 | 1.50 |
|  | 450° C. | 1.34 | 1.80 |

*Average of 4 samples

Figure 10:
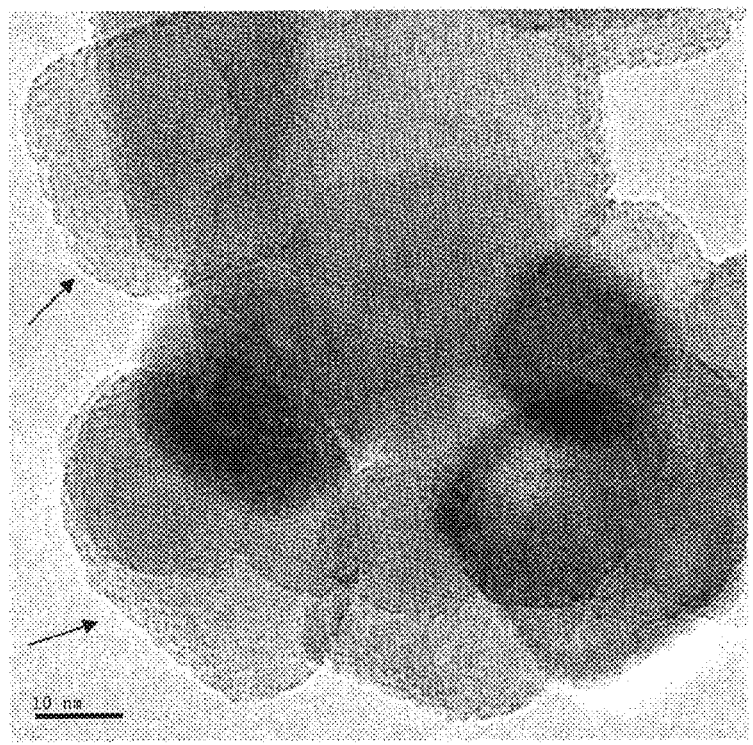
FIG. 10 is a transmission electron micrograph (TEM) of the catalytic particles of Example 11, showing anatase crystals with a patchy, two-dimensional silica layer on the outer crystal surface. In this image, no silica particles are observable.
Figure 11:
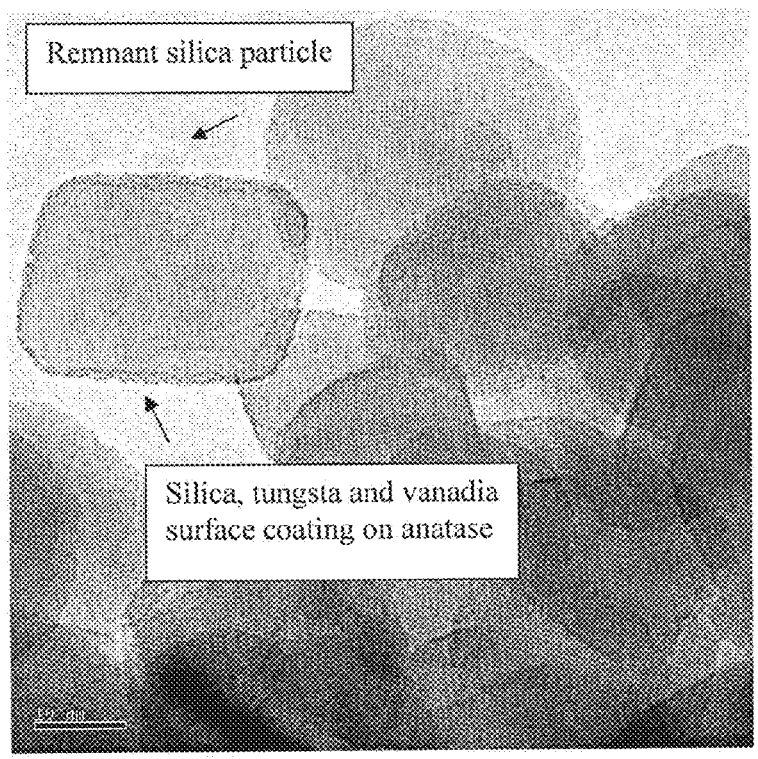
FIG. 11 is a transmission electron micrograph (TEM) of the catalytic particles of Example 11, showing anatase crystals with a patchy, two-dimensional silica layer on the outer crystal surface. In this image, one remnant silica particle that is <5 nm in diameter can be seen.

TEM analyses, as shown in FIGS. 10 and 11, indicate that, while there are a few remnant spherical silica particles that were not completely dissolved and re-precipitated, these are typically less than 5 nm in size. For the most part, the fumed silica has largely been dissolved and re-precipitated onto the anatase surface as a rough coating where it is most effective for modifying the surface properties of the underlying titania.

These results reveal the dramatic benefit in anatase phase stability (and resistance to sintering) offered by the material present invention, the benefit in retention of surface area associated with the inventive materials, and the activity advantage associated with the present invention when the silica, initially in particulate form, is solubilized and redistributed in nano-particulate form to provide a uniform coating on the titania surface.

Example 12

This example is another demonstration of the beneficial effect of redistribution of the silica via hydrothermal treatment, only in this case the starting source is colloidal silica. A slurry of production-made sulfated titania hydrogel was diluted to a $TiO_2$ content of 21.6 wt %. 208.3 g of this slurry was added to a round-bottom flask that was equipped with an overhead stirrer. This slurry was heated to a temperature of 60° C. via a temperature controlled heating mantle, and was maintained at that temperature throughout the preparation. To this mixture was added 6.7 g of a dispersion of colloidal silica AS-30 (W. R. Grace-30 wt % $SiO_2$) and the mixture was allowed to react for 30 min. 3.4 g of ammonium paratungstate (APT, 88% $WO_3$) was then added and allowed to react for 10 min. The pH was then adjusted up to 6.5 via the addition of concentrated $NH_4OH$ (29%). The pH was then adjusted up to 9.0 via the addition of concentrated $NH_4OH$ (29%), and this slurry was heated at reflux for 6 hr. It was then filtered, rinsed with DI water, and dried at 105° C. and then calcined at 500° C. for 6 hr. The final nominal composition of this product on an oxide basis was 90 wt % $TiO_2$, 4 wt % $SiO_2$ and 6 wt % $WO_3$ (90:4:6). Under these conditions the fractional monolayer coverage of the silica on the titania is well under 1.0. To this powder was deposited vanadia from MEA solution as in Examples 1-3, above, so that the final loading was 2% $V_2O_5$ on a total oxide basis. A portion of the dried powder was then heated to 750° C. and held at that temperature for 16 hr in an air atmosphere that contained 10 wt % $H_2O$.

The material from Example 12 was analyzed by XRD, $N_2$ Porosimetry and DeNOx activity and TEM. In order to evaluate the Example 12 material for DeNOx applications, a 0.1 g sample of each vanadia-loaded and aged catalyst sample was pelletized and meshed to 20/+40 mesh, and was loaded into a reactor to determine the conversion of NO in the presence of $NH_3$. A flowing stream that contained 5% $O_2$, 500 ppm $NH_3$, 500 ppm NO, and 10% $H_2O$ was passed over the catalyst at a space velocity of 650 l/g.cat-hr.

Results shown in Table 10 below compared to the prep with colloidal silica (but no hydrothermal treatment, Example 10). The XRD and $N_2$ BET analyses reveal that the Example 12 material has improved anatase phase stability and resistance to sintering, while the catalytic results show that the Example 12 material has improved catalytic activity as well associated with the hydrothermal redistribution of silica.

TABLE 10

Characterization of Samples

|  |  | Example 12 | Example 10 |
|---|---|---|---|
| XRD-Phase | % Anatase | 91.6 | 91.2 |
|  | % Rutile | 6.6 | 6.1 |
|  | % $WO_3$ | 1.8 | 2.7 |
| XRD-Crystal Size (A) | Anatase | 562 | 1863 |
|  | Rutile | 40 | NM |
|  | $WO_3$ | 694 | 268 |
| $N_2$ PSD | BET Surface Area ($m^2/g$) | 23.3 | 8.1 |
|  | BJH Pore Volume ($cm^3/g$) | 0.15 | 0.04 |
| NO Conversion, % | 250° C. | 31.0 | 8.4 |
|  | 350° C. | 76.4 | 34.0 |
|  | 450° C. | 79.9 | 33.2 |
| NO Rate, % | 250° C. | 0.37 | 0.09 |
|  | 350° C. | 1.40 | 0.42 |
|  | 450° C. | 1.60 | 0.40 |

*Average of 4 samples

Figure 12:
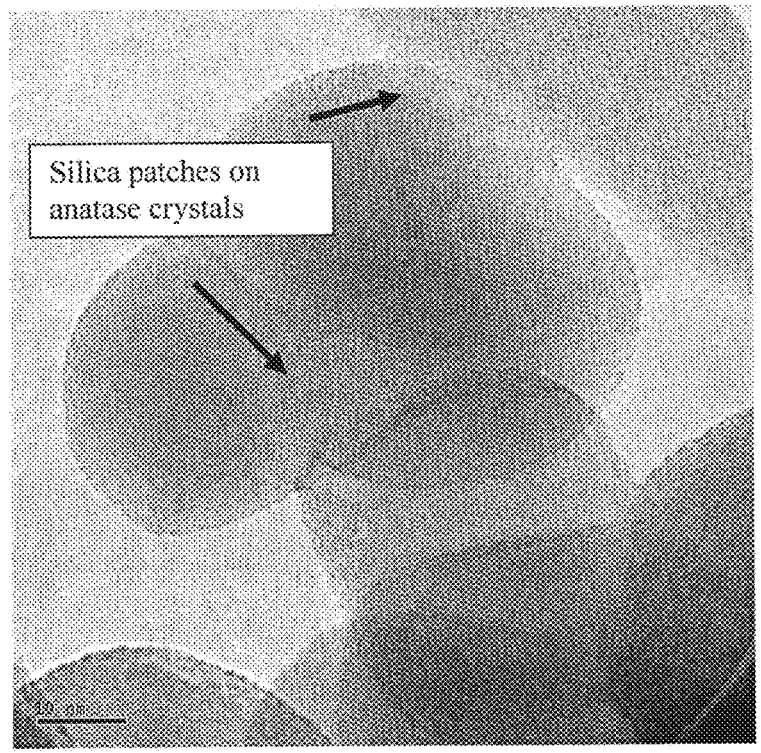
FIG. 12 is a transmission electron micrograph (TEM) of the catalytic particles of Example 12, showing small, two-dimensional patches of silica on the anatase crystallites.

A TEM image of the Example 12 material is shown below in FIG. 12. The analysis indicates that, while there are a few remnant spherical silica particles that were not completely dissolved and re-precipitated (roughly 10 nm in size or less), for the most part, the colloidal silica has substantially been dissolved and re-precipitated onto the anatase surface as a rough, patchy coating where it is more effective for modifying the surface properties of the titania.

Example 13

Silicic Acid

This example provides another embodiment of the present invention, wherein the low molecular weight silica is in the form of silicic acid generated via ion-exchange of sodium silicate. First, a dilute solution (3 wt % $SiO_2$) of sodium silicate was prepared by adding 569 g of DI water to 71 g of Philadelphia Quartz "N" sodium silicate, 28.7 wt % $SiO_2$. A 650.7 g portion (as received basis) of strong acid ion-exchange resin (Dowex 650C H-form) was weighed out. Separately, a slurry of production-made sulfated titania hydrogel was diluted to a $TiO_2$ content of 21.6 wt %. 1666.7 g of this slurry was added to a round-bottom flask that was equipped with an overhead stirrer. This slurry was heated to a temperature of 60° C. via a temperature controlled heating mantle, and was maintained at that temperature throughout the preparation. The ion-exchange resin was then added to the diluted sodium silicate solution with good mixing, and the pH was monitored. Once the pH indicated that the ion-exchange reaction had gone to completion (pH<3.0), the resin was filtered off, and 533 g of the silicic acid was added to the titania slurry. This mixture was allowed to react for 20 min. 27.3 g of ammonium paratungstate (APT, 88% $WO_3$) was then added and allowed to react for 20 min. The pH was then adjusted up to 6.5 via the addition of concentrated $NH_4OH$ (29%). The mixture was then filtered, rinsed with DI water, and dried at 105° C. and then calcined at 500° C. for 6 hr. The final nominal composition of this product on an oxide basis was 90 wt % $TiO_2$, 4 wt % $SiO_2$ and 6 wt % $WO_3$ (90:4:6). To this powder was deposited vanadia from MEA solution as in Examples 1-3, above, so that the final loading was 2 wt % $V_2O_5$ on a total oxide basis. A portion of the dried powder was then heated to 750° C. and held at that temperature for 16 hr in an air atmosphere that contained 10 wt % $H_2O$. In order to evaluate the Example 13 materials for DeNOx applications, a 0.1 g sample of each vanadia-loaded and aged catalyst sample was pelletized and meshed to −20/+40 mesh, and was loaded into a reactor to determine the conversion of NO in the presence of $NH_3$. A flowing stream that contained 5% $O_2$, 500 ppm $NH_3$, 500 ppm NO, and 10% $H_2O$ was passed over the catalyst at a space velocity of 650 l/g.cat-hr. The aged samples were then evaluated by XRD, $N_2$ PSD, DeNOx conversion and compared against DT-58™ as shown in Table 11.

TABLE 11

Characterization of Samples

| | | DT-58* | Example 13 |
|---|---|---|---|
| XRD-Phase | % Anatase | 95.4 | 100.0 |
| | % Rutile | 2.3 | 0.0 |
| | % $WO_3$ | 2.3 | 0.0 |
| XRD-Crystal Size (A) | Anatase | 391 | 286 |
| | Rutile | 89 | 0 |
| | $WO_3$ | 498 | 0 |
| $N_2$ PSD | BET Surface Area (m²/g) | 34.9 | 40.8 |
| | BJH Pore Volume (cm³/g) | 0.25 | 0.27 |
| NO Conversion, % | 250° C. | 19.4 | 29.6 |
| | 350° C. | 64.0 | 76.7 |
| | 450° C. | 73.1 | 83.0 |

*Average of 4 samples

Figure 13:
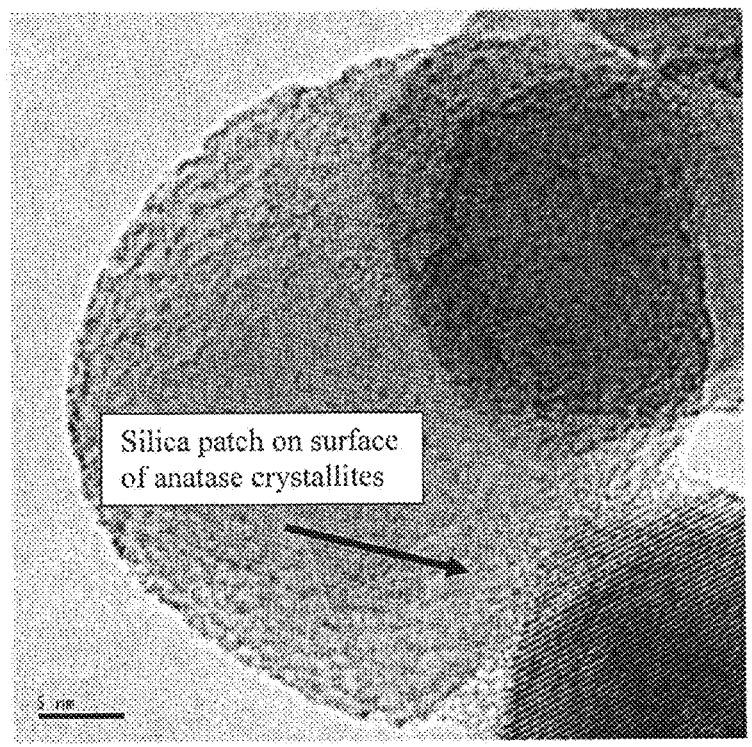
FIG. 13 is a transmission electron micrograph of silica patches present on the surface of the catalytic particles of anatase titania of Example 13.
Figure 14:
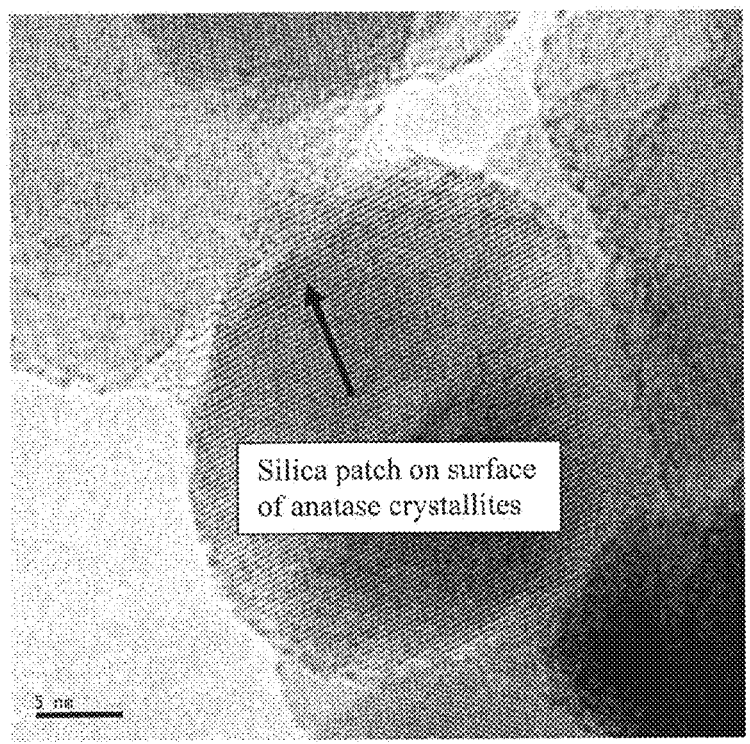
FIG. 14 is a transmission electron micrograph of silica patches present on the surface of the catalytic particles of anatase titania of Example 13.

It can clearly be seen that the material prepared according to the present invention has higher anatase phase stability, better retention of surface area (sintering resistance) and higher DeNOx activity compared to DT-58™. TEM analysis of the Example 13 material was conducted, and the results, highlighted in FIGS. 13 and 14, reveal that the silica is present as two dimensional patches well distributed on the titania surface. There are a few rare three dimensional particles identifiable as silica present in some of the images, but these are, for the most part, less than about 5 nm in size.

Example 14

Figure 15:
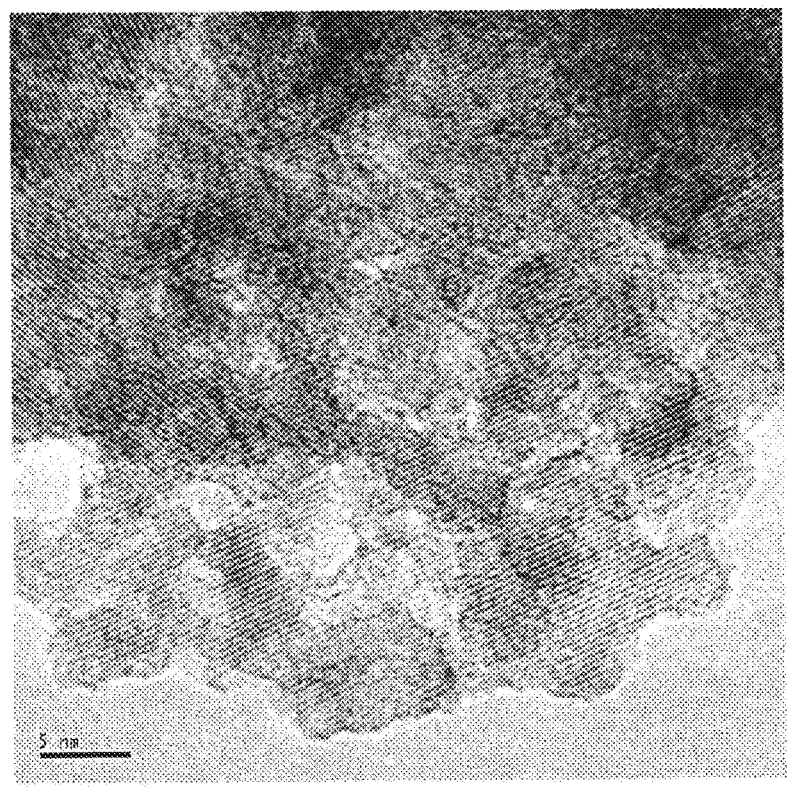
FIG. 15 is a transmission electron micrograph (TEM) of the catalyst support before vanadia addition and sintering. The image shows the lattice fringes associated with anatase titania; the silica is present as 1-3 nm patches on the titania surface (Example 14).

This Example provides another embodiment of the present invention, wherein the low molecular weight silica is in the form of silicic acid generated via ion-exchange of sodium silicate. First, a dilute solution (3 wt % $SiO_2$) of sodium silicate was prepared by adding 59.7 g of DI water to 7.0 g of Philadelphia Quartz "N" sodium silicate, 28.7 wt % $SiO_2$. A 13.5 g portion (as received basis) of strong acid ion-exchange resin (Dowex 650C H-form) was weighed out and added to a flow-through column. Separately, a slurry of production-made sulfated titania hydrogel was diluted to a $TiO_2$ content of 21.6 wt %. 208.3 g of this slurry was added to a round-bottom flask that was equipped with an overhead stirrer. This slurry was heated to a temperature of 60° C. via a temperature controlled heating mantle, and was maintained at that temperature throughout the preparation. 66.7 g of the diluted sodium silicate solution was then passed through the column to remove the sodium. This mixture was allowed to react for 20 min. 3.4 g of ammonium paratungstate (APT, 88% $WO_3$) was then added and allowed to react for 20 min. The pH was then adjusted up to 6.5 via the addition of concentrated $NH_4OH$ (29%). The mixture was then filtered, rinsed with DI water, and dried at 105° C. and then calcined at 500° C. for 6 hr. The final nominal composition of this product on an oxide basis was 90 wt % $TiO_2$, 4 wt % $SiO_2$ and 6 wt % $WO_3$ (90:4:6). This composition, before addition of vanadia, had a $N_2$ BET surface area of 221 m²/g, and so the silica is present at a fractional monolayer coverage of 0.30, well under 1 monolayer. This sample was evaluated using TEM. An identical sample was prepared, except that the tungsta was added before the silica, and this sample was analyzed by $^{29}Si$—CP-MASNMR spectroscopy. The NMR results shown in Table 6 demonstrate that most of the silica present in the sample has coordination of Q3 or less, as would be expected for silica distributed in two-dimensional patches on the titania surface. The TEM image shown in FIG. 15 reveals that the silica is present as 1-3 nm patchy coating on the anatase titania crystallite surface, and no distinct, 3-dimensional particles of silica can be seen larger than 5 nm in diameter.

To this powder was deposited vanadia from MEA solution as in Examples 1-3, above, so that the final loading was 2 wt % $V_2O_5$ on a total oxide basis. A portion of the dried powder was then heated to 750° C. and held at that temperature for 16 hr in an air atmosphere that contained 10 wt % $H_2O$. In order to evaluate the Example 14 materials for DeNOx applications, a 0.1 g sample of each vanadia-loaded and aged catalyst sample was pelletized and meshed to −20/+40 mesh, and was loaded into a reactor to determine the conversion of NO in the presence of $NH_3$. A flowing stream that contained 5% $O_2$, 500 ppm $NH_3$, 500 ppm NO, and 10% $H_2O$ was passed over the catalyst at a space velocity of 650 l/g.cat-hr. The aged samples were then evaluated by XRD, $N_2$ PSD, and DeNOx conversion and compared against DT-58 as shown in Table 12.

TABLE 12

Characterization of Samples

| | | DT-58 ™ | Example 14 |
|---|---|---|---|
| XRD-Phase | % Anatase | 95.4 | 100.0 |
| | % Rutile | 2.3 | 0.0 |
| | % $WO_3$ | 2.3 | 01.0 |
| XRD-Crystal Size (A) | Anatase | 391 | 336 |
| | Rutile | 89 | 0 |
| | $WO_3$ | 498 | 0 |
| $N_2$ PSD | BET Surface Area m²/g | 34.9 | 31.9 |
| | BJH Pore Volume (cm³/g) | 0.25 | 0.25 |

TABLE 12-continued

Characterization of Samples

| | | DT-58 ™ | Example 14 |
|---|---|---|---|
| NO Conversion, Rate | 250° C. | 0.22 | 0.41 |
| | 350° C. | 1.13 | 1.67 |
| | 450° C. | 1.43 | 1.99 |

It can clearly be seen that the material prepared according to the present invention has higher anatase phase stability, better retention of surface area (sintering resistance) and higher DeNOx activity compared to DT-58™.

Example 15

Figure 16:
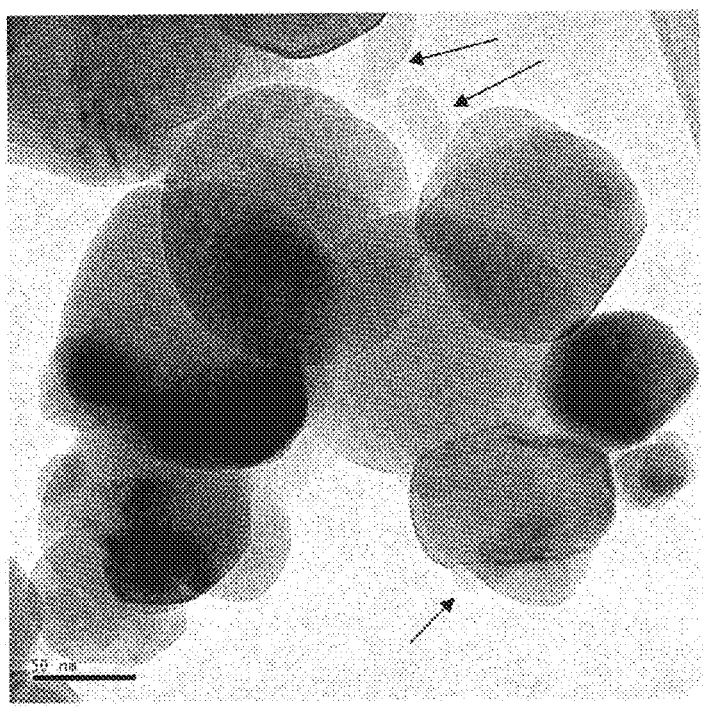
FIG. 16 is a transmission electron micrograph (TEM) of the vanadia catalyst that shows large (>20 nm) three dimensional silica nodules (see arrows) that are not well dispersed on the titania surface (e.g., Example 15).

This Example is directed to showing that various materials of the prior art are different from those of the present invention. In particular, reference is made to U.S. Pat. No. 4,221,768 column 3, 4 (line 3), Ex. 1, and US 2007/0129241 (paragraph 0026). In this example, a particulate colloidal silica is incorporated into the titania during the precipitation of the titania. First, 1169 g of water were added to a 4 L glass beaker, and this was placed in an ice bath to cool down. Then, 330 g of TiOCl$_2$ solution (25.9% TiO$_2$) was slowly added with stirring to the cooled water, such that the temperature of the solution did not rise above 30° C., in order to make a 5.7% TiO$_2$ solution. 544.6 g of this solution was then placed in a 1 L glass beaker, and was stirred vigorously. To this mixture was slowly added 4.33 g of Ludox AS-30 colloidal silica (W. R. Grace-30 wt % SiO$_2$). To this suspension was then added concentrated NH$_4$OH (29%) until the pH reached 7. The precipitated slurry was aged for 2 hrs. It was then filtered, rinsed with DI water and then dried at 105° C. The nominal composition, on an oxide basis, of this powder was 4 wt % SiO$_2$, and 96 wt % TiO$_2$. 27 gm of dried powder (84.5% solids) was then slurried in 100 g of DI water, heated to 60° C., and 1.7 g of APT was then added and allowed to react for 20 min. The pH was then adjusted to 7.0, and the final mixture was filtered and dried at 105° C. and then calcined at 500° C. for 6 hr. The final nominal composition of this product on an oxide basis was 90 wt % TiO$_2$, 4 wt % SiO$_2$ and 6 wt % WO$_3$. To this powder was deposited vanadia from MEA solution as in Examples 1-3, so the final loading of vanadia was 2 wt % V$_2$O$_5$ on a total oxide basis. A portion of the dried powder was then heated to 750° C. and held at that temperature for 16 hr in an air atmosphere that contained 10 wt % H$_2$O. In order to evaluate the Example 15 materials for DeNOx applications, a 0.1 g sample of each vanadia-loaded and aged catalyst sample was pelletized and meshed to −20/+40 mesh, and was loaded into a reactor to determine the conversion of NO in the presence of NH$_3$. A flowing stream that contained 5% O$_2$, 500 ppm NH$_3$, 500 ppm NO, and 10% H$_2$O was passed over the catalyst at a space velocity of 650 l/g.cat-hr. The aged samples were then evaluated by XRD, N$_2$ PSD, DeNOx conversion and TEM, and compared against DT-58™ as shown in Table 13 and FIG. 16.

TABLE 13

Characterization of Samples

| | | DT-58* | Example 15 |
|---|---|---|---|
| XRD-Phase | % Anatase | 95.4 | 90.0 |
| | % Rutile | 2.3 | 9.0 |
| | % WO$_3$ | 2.3 | 1.0 |

TABLE 13-continued

Characterization of Samples

| | | DT-58* | Example 15 |
|---|---|---|---|
| XRD-Crystal Size (A) | Anatase | 391 | 935 |
| | Rutile | 89 | 1567 |
| | WO$_3$ | 498 | 190 |
| N$_2$ PSD | BET Surface Area (m$^2$/g) | 34.9 | 10.2 |
| | BJH Pore Volume (cm$^3$/g) | 0.25 | 0.07 |
| NO Conversion, % | 250° C. | 19.4 | 13.2 |
| | 350° C. | 64.0 | 46.3 |
| | 450° C. | 73.1 | 57.9 |

*Average of 4 samples

Results clearly show that the comparison material of Example 15 (not formed from a low molecular weight and/or small nanoparticle silica) clearly has lower stability and activity than even the reference DT-58™ samples. Furthermore, TEM analysis (FIG. 16 reveals that the silica is present as large three-dimensional nodules (e.g., >20 nm and up to 50 nm or larger in size).

Example 16

This embodiment is similar to prior art embodiments where the silica is incorporated in a soluble form in the precipitation (see for example U.S. Pat. No. 4,221,768 col. 3, line 36), except in this example the TMA silicate of the present invention is used, as in Examples 7, 8 and 9. In this example, a material is prepared wherein silica is again incorporated during the precipitation of the titania. However, in this case, TMA silicate is used as the silica source, and titanyl sulfate solution is used as the titania source. First, 990 g of titanyl sulfate solution (10.1% TiO$_2$, ~29% H$_2$SO$_4$) was added to a 1 L beaker. In a separate beaker, 26.5 g of TMA silicate (9 wt % SiO$_2$, Alfa Aesar) was diluted 350 ml with DI water. In a third vessel with a spout for continuous removal of precipitated slurry, a 150 g heal of water was added, and this vessel was stirred. The titanyl sulfate solution was pumped into vessel 3 at a rate of 20 ml/min, and the TMA silicate solution was also pumped into vessel 3 at a rate of 10 ml/min. Further, concentrated NH$_4$OH (29%) was also pumped into vessel 3 to maintain a pH for precipitation of the oxides at 6.0. The overflow from vessel 3 was captured in another beaker. It will be known to persons of ordinary skill in the art that vessel 3 is a continuous-flow, stirred tank reactor. Once the precipitation of the oxides was complete, the precipitate was then filtered, rinsed with DI water and then dried at 105° C. The nominal composition, on an oxide basis, of this powder was 2.5 wt % SiO$_2$, 97.5 wt % TiO$_2$. 51.2 gm of the dried powder (73% solids) was then slurried in 122 g of DI water, heated to 60° C., and 1.8 g of APT was then added and allowed to react for 20 min. The pH was then adjusted to 6.5 and allowed to react for 20 min. The final mixture was filtered and dried at 105° C. and then calcined at 500° C. for 6 hr. The final nominal composition of this product on an oxide basis was 93.5 wt % TiO$_2$, 2.5 wt % SiO$_2$ and 4 wt % WO$_3$ (93.5:2.5:4). To this powder was deposited vanadia from MEA solution as in Examples 1-3, so that the final loading of vanadia was 2 wt % V$_2$O$_5$ on a total oxide basis. A portion of the dried powder was then heated to 750° C. and held at that temperature for 16 hr in an air atmosphere that contained 10 wt % H$_2$O. In order to evaluate the Example 16 materials for DeNOx applications, a 0.1 g sample of each vanadia-loaded and aged catalyst sample was pelletized and meshed to −20/+40 mesh, and was loaded into a reactor to determine the conversion of NO in the presence of NH$_3$. A flowing stream that contained 5% O$_2$, 500 ppm NH$_3$, 500 ppm NO, and 10% H$_2$O was passed over the catalyst at a space velocity of 650 l/g.cat-hr. The aged samples were then evaluated by XRD, N2 PSD, DeNOx conversion and compared against DT-58™ as shown in Table 14.

Figure 17:
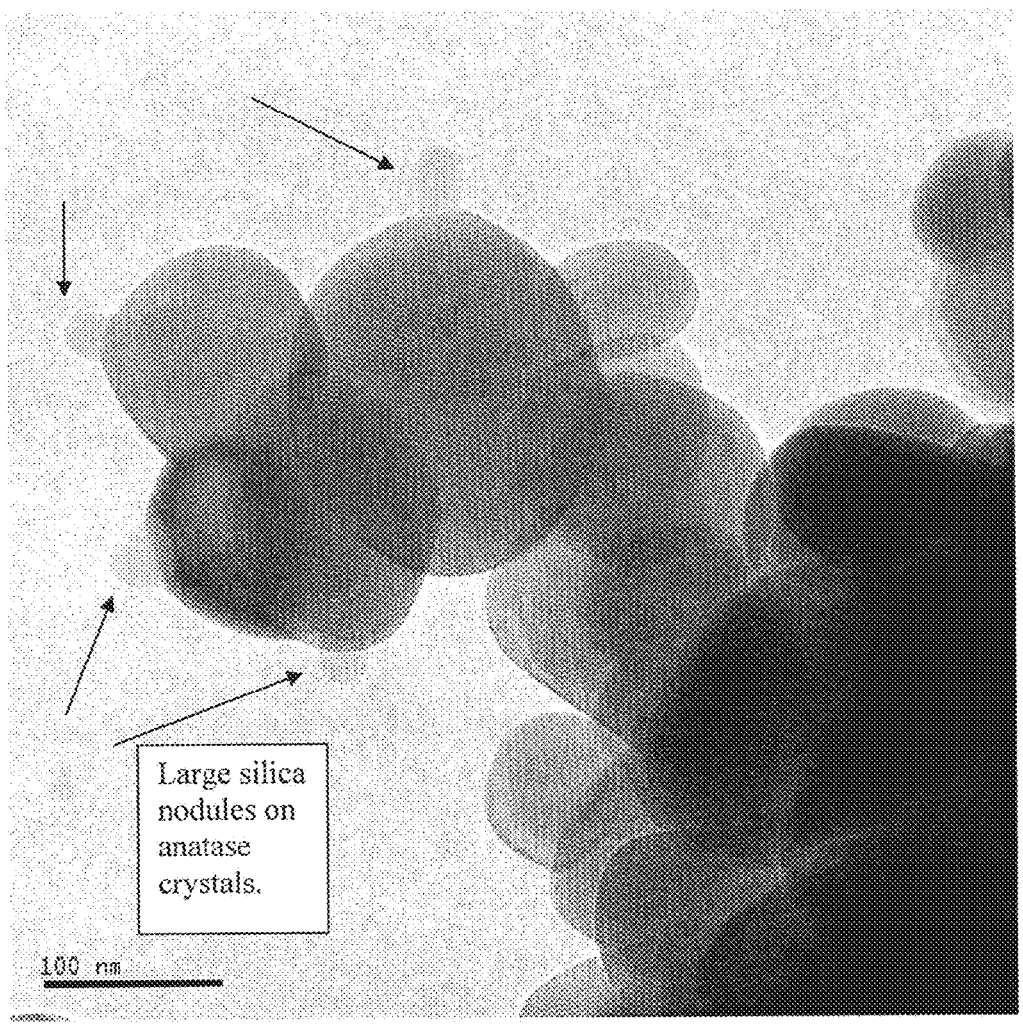
FIG. 17 is another transmission electron micrograph (TEM) of the vanadia catalyst that shows large (>20 nm) three dimensional silica nodules (see arrows) that are not well dispersed on the titania surface (e.g., Example 15).

The results clearly show that the material produced under conditions wherein a low molecular weight and/or small nanoparticle form silica is incorporated during the precipitation of the titania has lower anatase phase stability, lower sintering resistance and lower DeNOx activity that the base case materials. Shown in FIG. 17 is a transmission electron micrograph (TEM) of the vanadia catalyst that shows large (>20 nm) three dimensional silica nodules that are not well dispersed on the titania surface.

TABLE 14

Characterization of Samples

|  |  | DT-58* | Example 16 |
|---|---|---|---|
| XRD-Phase | % Anatase | 95.4 | 82.3 |
|  | % Rutile | 2.3 | 14.8 |
|  | % WO$_3$ | 2.3 | 2.9 |
| XRD-Crystal Size (Å) | Anatase | 391 | 1456 |
|  | Rutile | 89 | 1994 |
|  | WO$_3$ | 498 | 353 |
| N$_2$ PSD | BET Surface Area (m$^2$/g) | 34.9 | 12.0 |
|  | BJH Pore Volume (cm$^3$/g) | 0.25 | 0.05 |
| NO Conversion, % | 250° C. | 19.4 | 12.2 |
|  | 350° C. | 64.0 | 50.0 |
|  | 450° C. | 73.1 | 55.8 |

*Average of 4 samples

Example 17

This embodiment is similar to Example 16, only the final composition is 90:4:6 wt % TiO$_2$, SiO$_2$, WO$_3$ prior to vanadia addition. In this example, a material is prepared wherein silica is again incorporated during the precipitation of the titania. First, 891 g of titanyl sulfate solution (10.1% TiO$_2$, ~29% H$_2$SO$_4$) was added to a 1 L beaker. In a separate beaker, 44.4 g of TMA silicate (9 wt % SiO$_2$, Alfa Aesar) was diluted with 400 ml with DI water. In a third vessel with a spout for continuous removal of precipitated slurry, a 150 g heal of water was added, and this vessel was stirred. The titanyl sulfate solution was pumped into vessel 3 at a rate of 20 ml/min, and the TMA silicate solution was also pumped into vessel 3 at a rate of 10 ml/min. Further, concentrated NH$_4$OH (29%) was also pumped into vessel 3 to maintain a pH for precipitation of the oxides at 6.0. The overflow from vessel 3 was captured in another beaker. It will be known to persons of ordinary skill in the art that vessel 3 is a continuous-flow, stirred tank reactor. Once the precipitation of the oxides was complete, the precipitate was then filtered, rinsed with DI water and then dried at 105° C. The nominal composition, on an oxide basis, of this powder was 4.3 wt % SiO$_2$, 96.7 wt % TiO$_2$.

All of the dried powder was then slurried in ~150 g of DI water, heated to 60° C., and 6.8 g of APT was then added and allowed to react for 20 min. The pH was then adjusted to 6.5 and allowed to react for 20 min. The final mixture was filtered and dried at 105° C. and then calcined at 500° C. for 6 hr. The final nominal composition of this product on an oxide basis was 90 wt % TiO$_2$, 4 wt % SiO$_2$ and 6 wt % WO$_3$. To this powder was deposited vanadia from MEA solution as in Examples 1-3, so that the final loading of vanadia was 2 wt % V$_2$O$_5$ on a total oxide basis. A portion of the dried powder was then heated to 750° C. and held at that temperature for 16 hr in an air atmosphere that contained 10 wt % H$_2$O. In order to evaluate the Example 17 material for DeNOx applications, a 0.1 g sample of each vanadia-loaded and aged catalyst sample was pelletized and meshed to –20/+40 mesh, and was loaded into a reactor to determine the conversion of NO in the presence of NH$_3$. A flowing stream that contained 5% O$_2$, 500 ppm NH$_3$, 500 ppm NO, and 10% H$_2$O was passed over the catalyst at a space velocity of 650 l/g.cat-hr. The aged samples were then evaluated by XRD, N$_2$ PSD, DeNOx conversion and compared against DT-58™ as shown in Table 15.

TABLE 15

Characterization of Samples

|  |  | DT-58* | Example 17 |
|---|---|---|---|
| XRD-Phase | % Anatase | 95.4 | 94.5 |
|  | % Rutile | 2.3 | 3.9 |
|  | % WO$_3$ | 2.3 | 1.6 |
| XRD-Crystal Size (Å) | Anatase | 391 | 748 |
|  | Rutile | 89 | 795 |
|  | WO$_3$ | 498 | 180 |
| N$_2$ PSD | BET Surface Area (m$^2$/g) | 34.9 | 18.2 |
|  | BJH Pore Volume (cm$^3$/g) | 0.25 | 0.09 |
| NO Conversion, % | 250° C. | 19.4 | 16.2 |
|  | 350° C. | 64.0 | 58.4 |
|  | 450° C. | 73.1 | 67.0 |

*Average of 4 samples

The results clearly show that the material made wherein a soluble silica is incorporated during the precipitation of the titania has lower anatase phase stability, lower sintering resistance and lower DeNOx activity that the base case materials.

Example 18

Figure 18:
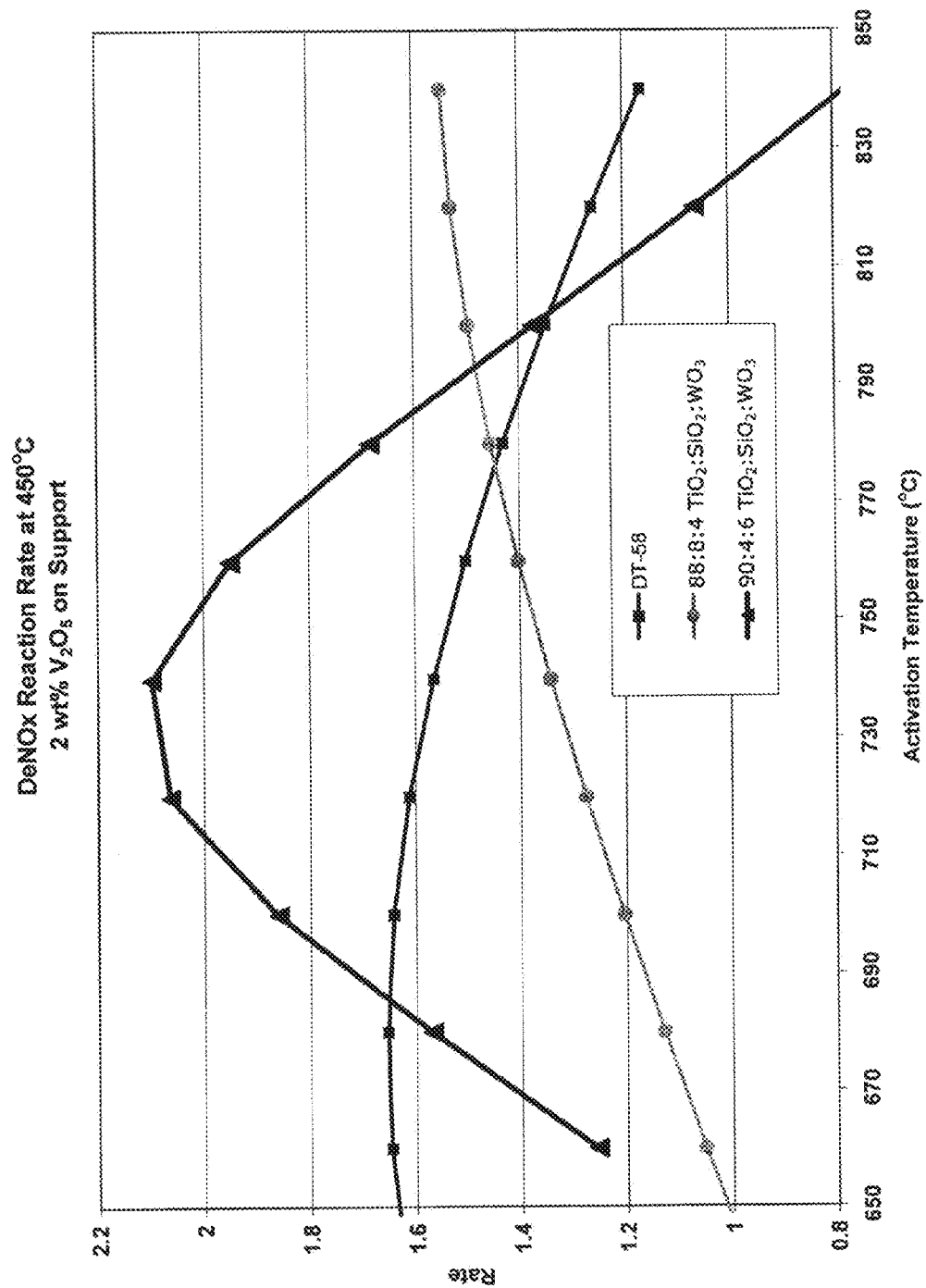
FIG. 18 is a graph showing the effect of various calcination (activation) temperatures on the deNOx catalytic activities of forms of titania-supported vanadium catalysts.

This embodiment demonstrates the effect of calcination temperature on the deNOx catalytic activity of the materials of the present invention. The DT-58™ reference catalysts loaded with 2 wt % V$_2$O$_5$ described in Example 8 were used as the benchmark. A 90:4:6 TiO$_2$:SiO$_2$:WO$_3$ composition of the present invention, as prepared in Example 13 (batch mode) and Example 14 (continuous mode) were loaded with 2 wt % V$_2$O$_5$ as described in those Examples. A 88:8:4 TiO$_2$:SiO$_2$:WO$_3$ composition of the present invention, as prepared in Example 9, was also loaded with 2 wt % V$_2$O$_5$ as described therein. These materials were then exposed to elevated temperatures (calcined) ranging from 500° C. to 850° C., and the rate of deNOx catalytic activity was measured as in Example 17. The data of the results were fitted by regression to polynomial functions, and the fitted curves are shown in FIG. 18. FIG. 18 demonstrates that in order to obtain the maximum activity for the vanadia catalyst materials of the present invention, in particular activity that is greater than the reference DT-58 activity, the vanadia catalyst materials must first be exposed to elevated temperatures, i.e., temperatures in excess of 650° C.

Utility

The present invention is directed, in one embodiment, to compositions comprising anatase titania, wherein the titania is stabilized by a silica provided in a low molecular weight form and/or small nanoparticle form. Further, the invention is directed to the use of these silica-titania compositions as catalyst supports, in particular in combination with added tungsta and vanadia, for vanadia-based selective catalytic reduction of DeNOx from lean-burn (diesel) engines. The invention further is directed to methods of producing these silica-stabilized titania or titania-tungsta supports, and the vanadia-based catalysts which comprise the silica-stabilized titania or titania-tungsta supports, and the methods of production of the vanadia catalysts, and to catalytic devices comprising these vanadia catalysts.

The actual specific composition of the silica-titania or silica-titania-tungsta catalyst support depends on the requirements of the specific catalytic application. In one preferred composition, the invention comprises a silica-stabilized titania catalyst support which comprises particles which comprise ≥90% dry weight of $TiO_2$ and ≤10 wt % $SiO_2$. In another preferred composition, the invention comprises a silica stabilized titania-tungsta catalyst support with ≥85% dry weight titania, 3%-10% dry weight of $SiO_2$, and 3%-10% dry weight of $WO_3$. Alternatively, in one embodiment where the application requires particularly good thermal stability, the catalyst support comprises ≥85% dry weight of $TiO_2$, 5.0%-9.0% dry weight of $SiO_2$, and 3.0%-7.0% dry weight of $WO_3$. More particularly, this stable catalyst support comprises 87%-89% dry weight of $TiO_3$, 7%-9% dry weight of $SiO_2$, and 3%-5% dry weight of $WO_3$. In one preferred embodiment the catalyst support comprises about 88% (±0.5%) dry weight $TiO_2$, about 8% (±0.5%) dry weight $SiO_2$, and about 4% (±0.5%) dry weight $WO_3$. In one embodiment, the weight % of $WO_3$ is less than the weight of % of $SiO_2$. In one embodiment, the catalytic support has a fresh surface area of at least 80 $m^2$/gm, and more preferably at least 100 $m^2$/gm.

In another embodiment where the application requires particularly good catalytic activity, the catalyst support comprises ≥85% dry weight of $TiO_2$, 3.0%-8.0% dry weight of $SiO_2$, and 4.0%-9.0% dry weight of $WO_3$. More particularly, this active catalyst support comprises ≥87% dry weight of $TiO_3$, 3%-6% dry weight of $SiO_2$, and 4%-8% dry weight of $WO_3$. In one preferred embodiment the catalyst support comprises about 90% (±0.5%) dry weight $TiO_2$, about 4% (±0.5%) dry weight $SiO_2$, and about 6% (±0.5%) dry weight $WO_3$. In one embodiment, the weight % of $WO_3$ is greater than the weight of % of $SiO_2$. In one embodiment, the catalytic support has a fresh surface area of at least 80 $m^2$/gm, and more preferably at least 100 $m^2$/gm.

In an embodiment of the invention, the $TiO_2$ component of the catalyst support material used herein substantially comprises a surface area <400 $m^2$/g and a pore volume <0.40 $cm^3$/g.

In an embodiment of the invention the titania slurry and silica component used herein are mixed at a temperature <80° C. and at a pH<8.5. Alternatively, the titania slurry and silica component used herein may be mixed at a temperature <70° C. and at a pH<7.0.

In another embodiment, the invention is a vanadia catalyst comprising the novel silica-stabilized titania or titania-tungsta catalyst support described herein upon which a quantity of vanadium oxide ($V_2O_5$) is disposed. In the vanadia catalyst, $V_2O_5$ preferably comprises 0.5% to 3% to 5% of the dry weight thereof. The invention further is directed to diesel engine emission catalytic devices which contain the vanadia catalysts described herein. The vanadia catalyst materials of the invention may be further treated by calcination (sintering) at a temperature ≥650° C. to increase their deNOx catalytic activity.

Furthermore, these novel catalytic devices may be used upstream or downstream of a diesel particulate filter (DPF) in a diesel emission control system. In an upstream system the catalytic device is between the engine and the DPF, and in a downstream system the DPF is between the engine and the catalytic device.

Where and used herein the term "silica titania support" is intended to have the same meaning as "silica-stabilized titania support", and where the term silica titania tungsta support" is intended to have the same meaning as "silica stabilized titania-tungsta support".

Preferably most of the silica particles in the stabilized titania support particles have diameters <5 nm, and more preferably <4 nm and more preferably <3 nm, and still more preferably <2 nm, and/or comprise low molecular weights (e.g., MW<100,000, whether or not the particles do, or do not, have $V_2O_5$ deposited thereon.

Where the silica titania support particles contain $V_2O_5$, the $V_2O_5$ preferably comprise from 0.5%-3.0% of the dry weight of the support material.

Distribution of the $WO_3$ and $SiO_2$ species on the surface of the titania support also plays a role in the optimization of DeNOx activity of the vanadia catalysts. Thus, when the catalysts are freshly prepared, that is, when the added silica and tungsta oxides are first deposited and before high temperature treatment, the fractional monolayer coverage should be about 1.0 or less.

As noted above, the stabilization of titania support material with silica involves treatment of the titania with silica in a low molecular weight form and/or small nanoparticle form, such as tetra(alkyl)ammonium silicate (e.g., tetramethylammonium silicate) or tetraethylorthosilicate (TEOS). Other examples of low molecular weight and/or small nanoparticle silica precursors which may be used in the present invention include, but are not limited to aqueous solutions of silicon halides (i.e., anhydrous $SiX_4$, where X=F, Cl, Br, or I), silicon alkoxides (i.e., $Si(OR)_4$, where R=methyl, ethyl, isopropyl, propyl, butyl, iso-butyl, see-butyl, tert-butyl, pentyls, hexyls, octyls, nonyls, decyls, undecyls, and dodecyls, for example), other silicon-organic compounds such as hexamethyldisilazane, fluoro-silicic acid salts such as ammonium hexafluorosilicate [$(NH_4)_2SiF_6$], quaternary ammonium silicate solutions (e.g., $(NR_4)_n$, $(SiO_2)$, where R=H, or alkyls such as listed above, and when n=0.1-2, for example), aqueous sodium and potassium silicate solutions ($Na_2SiO_3$, $K_2SiO_3$, and $MSiO_3$ wherein M is Na or K in varying amounts in ratio to Si), silicic acid $(Si(OH)_4)$ generated by ion exchange of any of the cationic forms of silica listed herein using an acidic ion-exchange resin (e.g., ion-exchange of the alkali-silicate solutions or quaternary ammonium silicate solutions). In preferred embodiments, the titania used herein has not been prepared in the presence of urea.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, items of manufacture, compositions of matter, means, methods and steps described in the specification. As one of ordinary skill in the art will readily appreciate from the disclosure of the present invention, processes, items of manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, items of manufacture, compositions of matter, means, methods, or steps.

Each of the references, patents or publications cited herein is hereby expressly incorporated by reference in its entirety.

CITED REFERENCES

1. Granger, P. And Parvulescu, V. I. Eds. "Studies In Surface Science and Catalysis. Vol. 171, Ch. 9 (2007).
2. Ullmann. "Encyclopedia of Industrial Chemistry." Fifth ed., Vol. A23, pp. 583-660, (1993).
3. Iler, R. K. "The Chemistry of Silica." (1979).
4. Fedeyko et al. "Langmuir," Vol. 21, 5179-5206, (2005).
5. Engelhardt G. and D. Michel. "High Resolution Solid-State NMR of Silicates and Zeolites." John Wiley and Sons, NY (1987).
6. Wachs, I., et al. "Catalysis Today," 78, p. 17 (2003).
7. Wachs, I., et al. "Catalysis Today," 116, p. 162-168 (2008).
8. Bergna, H. E., and W. O. Roberts, eds. "Colloidal Silica, Fundamentals and Applications." Surfactant Science Series, Vol. 131, CRC Press, Taylor and Francis (2006).
9. Wachs, et al. "J. Catalysis," 161, pp. 211-221 (1996).
10. Bergna, H. ed. "The Colloid Chemistry of Silica," ACS Series 234 (1994).
11. Brinker, C. J. and G. W. Scherer. "Sol-Gel Science," Chapter 3 (1990).

What is claimed is:

1. A method of producing a catalyst support material, comprising:
    providing a slurry comprising $TiO_2$;
    combining the $TiO_2$ slurry with (1) a silica precursor solution comprising $SiO_2$ nanoparticles having a diameter of less than 5 nm and with (2) $WO_3$, to form a $TiO_2$—$WO_3$—$SiO_2$ mixture; wherein the silica precursor solution is combined with the $TiO_2$ slurry before, after, or while the $WO_3$ is combined with the $TiO_2$ slurry; and
    sintering the $TiO_2$—$WO_3$—$SiO_2$ mixture to form a silica-stabilized titania support material.

2. The method of claim 1 wherein the silica-stabilized titania support material, comprises:
    86%-94% dry weight of $TiO_2$, 3%-9% dry weight of a $SiO_2$, and 3%-7% dry weight of $WO_3$; and wherein the titania support material has a surface area of at least 80 $m^2/gm$ before sintering.

3. The method of claim 1 wherein the $TiO_2$ of the slurry comprise preformed titanium hydroxide, titanium oxy-hydroxide or titanium dioxide particles.

4. The method of claim 1 wherein the $TiO_2$ of the slurry is not produced in the presence of urea.

5. The method of claim 1 wherein the $SiO_2$ of the silica precursor solution comprises a diameter of less than 4 nm.

6. The method of claim 1 wherein the silica precursor solution comprises a tetra(alkyl)ammonium silicate solution or silicic acid.

7. The method of claim 1 wherein the $SiO_2$ substantially comprises patches which are ≤5 nm in depth after redistribution as seen by scanning electron microscopy or by transmission electron microscopy.

8. The method of claim 1 comprising combining the $TiO_2$—$WO_3$—$SiO_2$ mixture with $V_2O_5$ to form a vanadia catalyst.

9. The method of claim 8 wherein the vanadia catalyst comprises 0.5%-3% dry weight of $V_2O_5$.

10. The method of claim 8 wherein the $V_2O_5$ of the vanadia catalyst is present at a fractional monolayer value of less than 1.0 before sintering.

11. The method of claim 8 comprising the additional step of sintering the vanadia catalyst at ≥650° C.

12. A method of producing a catalyst support material, comprising:
    providing a slurry comprising $TiO_2$ and combining the $TiO_2$ slurry with (1) a silica precursor solution comprising $SiO_2$, wherein at least 50% of the $SiO_2$ of the silica precursor solution comprises silicon atoms in the $Q^3$, $Q^2$, $Q^1$ and $Q^0$ coordination environments, and with (2) $WO_3$, to form a $TiO_2$—$WO_3$—$SiO_2$ mixture; wherein the silica precursor solution is combined with the $TiO_2$ slurry before, after, or while the $WO_3$ is combined with the $TiO_2$ slurry and; and sintering the $TiO_2$—$WO_3$—$SiO_2$ mixture to form a silica-stabilized titania support material.

13. A method of producing a catalyst support material, comprising:
    providing a slurry comprising $TiO_2$ and combining the $TiO_2$ slurry with (1) a silica precursor solution comprising silicic acid and with (2) $WO_3$, to form a $TiO_2$—$WO_3$—$SiO_2$ mixture; wherein the silica precursor solution is combined with the $TiO_2$ slurry before, after, or while the $WO_3$ is combined with the $TiO_2$ slurry and; and sintering the $TiO_2$—$WO_3$—$SiO_2$ mixture to form a silica-stabilized titania support material.

* * * * *